US011074643B1

(12) United States Patent
Ellithorpe et al.

(10) Patent No.: US 11,074,643 B1
(45) Date of Patent: Jul. 27, 2021

(54) METHOD AND SYSTEMS FOR EFFICIENT PRODUCT NAVIGATION AND PRODUCT CONFIGURATION

(71) Applicant: Model N, Inc., Redwood Shores, CA (US)

(72) Inventors: John Ellithorpe, Redwood Shores, CA (US); Yihua Ding, Sunnyvale, CA (US); Manfred Hettenkofer, San Francisco, CA (US); David Cadwallader, Evergreen, CO (US); Jenny Chang, Milpitas, CA (US)

(73) Assignee: Model N, Inc., Redwood Shores, CA (US)

( * ) Notice: Subject to any disclaimer, the term of this patent is extended or adjusted under 35 U.S.C. 154(b) by 982 days.

(21) Appl. No.: 14/137,514

(22) Filed: Dec. 20, 2013

Related U.S. Application Data

(63) Continuation-in-part of application No. 14/069,362, filed on Oct. 31, 2013, now Pat. No. 10,373,066.

(Continued)

(51) Int. Cl.
*G06Q 30/06* (2012.01)
*G06Q 20/14* (2012.01)
*G06Q 30/02* (2012.01)

(52) U.S. Cl.
CPC ......... *G06Q 30/0641* (2013.01); *G06Q 20/14* (2013.01); *G06Q 30/0206* (2013.01); *G06Q 30/0621* (2013.01)

(58) Field of Classification Search
CPC .................................................... G06Q 30/06
(Continued)

(56) References Cited

U.S. PATENT DOCUMENTS 5,515,269 A 5/1996 Willis et al.
5,515,524 A 5/1996 Lynch et al.
(Continued)

OTHER PUBLICATIONS

Kamis, A., Stern, T., & Ladik, D. M. (2010). A flow-based model of web site intentions when users customize products in business-to-consumer electronic commerce. Information Systems Frontiers, 12(2), 157-168. doi:http://dx.doi.org/10.1007/s10796-008-9135-y.*

(Continued)

*Primary Examiner* — Jeffrey A. Smith
*Assistant Examiner* — Jennifer V Lee
(74) *Attorney, Agent, or Firm* — Patent Law Works LLP

(57) ABSTRACT

Various product-configuration-related implementations are described herein. In one example implementation, a selection of a product is received. A plurality of sections associated with the product is determined. One or more option groups are determined for each of the sections. Each of the option groups includes one or more options for the product. A product configuration page is generated and provided for presentation to a user. The product configuration page includes a navigation panel. The navigation panel includes a plurality of tabs. Each tab in the plurality of tabs represents a certain section from the plurality of sections and includes one or more indicators corresponding to the one or more option groups included in the certain section. Each of the one or more indicators visually indicates whether an option from a corresponding option group has been selected.

14 Claims, 27 Drawing Sheets

Related U.S. Application Data

(60) Provisional application No. 61/740,816, filed on Dec. 21, 2012.

(58) Field of Classification Search
USPC .................................................. 705/26.1–27.2
See application file for complete search history.

(56) References Cited

U.S. PATENT DOCUMENTS

| | | | |
|---|---|---|---|
| 5,576,965 A | 11/1996 | Akasaka et al. | |
| 5,617,514 A | 4/1997 | Dolby et al. | |
| 5,630,025 A | 5/1997 | Dolby et al. | |
| 5,708,798 A | 1/1998 | Lynch et al. | |
| 5,809,133 A | 9/1998 | Bartkowiak et al. | |
| 6,002,854 A | 12/1999 | Lynch et al. | |
| 6,035,305 A | 3/2000 | Strevey et al. | |
| 6,115,547 A | 9/2000 | Ghatate et al. | |
| 6,144,930 A | 11/2000 | Kinzelman | |
| 6,161,051 A | 12/2000 | Hafemann et al. | |
| 6,188,977 B1 | 2/2001 | Hirota | |
| 6,219,659 B1 | 4/2001 | Kliorin | |
| 6,233,493 B1 | 5/2001 | Cherneff et al. | |
| 6,424,989 B1 | 7/2002 | Shaw et al. | |
| 6,430,730 B1 | 8/2002 | Ghatate et al. | |
| 6,442,537 B1 | 8/2002 | Karch | |
| 6,694,359 B1 | 2/2004 | Morris et al. | |
| 6,820,073 B1 | 11/2004 | Bedell et al. | |
| 6,854,524 B1 | 2/2005 | Williams | |
| 6,856,980 B2 | 2/2005 | Feldman et al. | |
| 6,915,253 B1 | 7/2005 | Chapman | |
| 7,043,407 B2 | 5/2006 | Lynch et al. | |
| 7,080,142 B2 | 7/2006 | Galloway et al. | |
| 7,200,583 B1 | 4/2007 | Shah et al. | |
| 7,340,409 B1 | 3/2008 | Ulwick | |
| 7,401,061 B2 | 7/2008 | Law | |
| 7,433,748 B2 | 10/2008 | Selway | |
| 7,441,230 B2 | 10/2008 | Kainz et al. | |
| 7,483,869 B2 | 1/2009 | Kumar | |
| 7,669,133 B2 | 2/2010 | Chikirivao et al. | |
| 7,676,387 B2 | 3/2010 | Childress et al. | |
| 7,930,922 B2 | 4/2011 | Onishi et al. | |
| 7,949,738 B2 | 5/2011 | Kumar | |
| 7,970,724 B1 | 6/2011 | Hauser | |
| 8,160,990 B2 | 4/2012 | Varmaraja et al. | |
| 8,230,390 B2 | 7/2012 | Koster | |
| 8,682,773 B1 | 3/2014 | Murphy et al. | |
| 8,943,003 B2 | 1/2015 | Ardoint et al. | |
| 2001/0025264 A1 | 9/2001 | Deaddio et al. | |
| 2002/0035463 A1 | 3/2002 | Lynch et al. | |
| 2002/0072956 A1 | 6/2002 | Willems et al. | |
| 2002/0111891 A1 | 8/2002 | Hoffman et al. | |
| 2002/0120917 A1 | 8/2002 | Abrari et al. | |
| 2002/0154114 A1 | 10/2002 | Christensen et al. | |
| 2002/0169658 A1 | 11/2002 | Adler | |
| 2002/0198856 A1 | 12/2002 | Feldman et al. | |
| 2003/0018486 A1 | 1/2003 | Feldman et al. | |
| 2003/0033240 A1 | 2/2003 | Balson et al. | |
| 2003/0130852 A1 | 7/2003 | Tanaka et al. | |
| 2003/0158759 A1 | 8/2003 | Kannenberg | |
| 2003/0212584 A1 | 11/2003 | Flores | |
| 2004/0059808 A1 | 3/2004 | Galloway et al. | |
| 2004/0078796 A1 | 4/2004 | Utsumi | |
| 2004/0088195 A1 | 5/2004 | Childress et al. | |
| 2004/0088199 A1 | 5/2004 | Childress et al. | |
| 2004/0122747 A1 | 6/2004 | Jimenez et al. | |
| 2004/0128117 A1 | 7/2004 | Crandall et al. | |
| 2004/0181441 A1 | 9/2004 | Fung et al. | |
| 2005/0090911 A1 | 4/2005 | Ingargiola et al. | |
| 2005/0096950 A1 | 5/2005 | Caplan et al. | |
| 2005/0097146 A1 | 5/2005 | Konstantinou et al. | |
| 2005/0102249 A1 | 5/2005 | Bigus | |
| 2005/0182693 A1* | 8/2005 | Alivandi | A63F 13/12 705/26.5 |
| 2005/0183025 A1 | 8/2005 | Kumar | |
| 2005/0222996 A1 | 10/2005 | Yalamanchi | |
| 2005/0263594 A1 | 12/2005 | Onischu | |
| 2006/0069892 A1 | 3/2006 | Nakanishi et al. | |
| 2006/0100829 A1 | 5/2006 | Lynch et al. | |
| 2006/0129978 A1 | 6/2006 | Abrari et al. | |
| 2006/0167577 A1 | 7/2006 | Clark et al. | |
| 2006/0168573 A1 | 7/2006 | Clark et al. | |
| 2006/0282458 A1 | 12/2006 | Tsyganskiy et al. | |
| 2006/0294058 A1 | 12/2006 | Zabback et al. | |
| 2007/0094060 A1 | 4/2007 | Apps et al. | |
| 2007/0213968 A1 | 9/2007 | Nakagawa et al. | |
| 2007/0260667 A1 | 11/2007 | Duzak et al. | |
| 2008/0040682 A1* | 2/2008 | Sorenson | G06F 3/04817 715/777 |
| 2008/0059273 A1 | 3/2008 | Miller | |
| 2008/0082569 A1 | 4/2008 | Mansour et al. | |
| 2008/0104015 A1 | 5/2008 | Burger et al. | |
| 2008/0163101 A1* | 7/2008 | Rimas-Ribikauskas | G06F 3/0481 715/781 |
| 2008/0196002 A1 | 8/2008 | Koster | |
| 2008/0208923 A1 | 8/2008 | Watanabe et al. | |
| 2008/0216148 A1 | 9/2008 | Bienek et al. | |
| 2009/0006301 A1 | 1/2009 | Goetsch et al. | |
| 2009/0248597 A1 | 10/2009 | Fickie et al. | |
| 2009/0287617 A1 | 11/2009 | Schmidt | |
| 2009/0300419 A1 | 12/2009 | Silverman et al. | |
| 2010/0121795 A1 | 5/2010 | Colena et al. | |
| 2010/0161360 A1 | 6/2010 | Clement et al. | |
| 2010/0262443 A1 | 10/2010 | D'Albis et al. | |
| 2011/0087689 A1 | 4/2011 | Ziegler | |
| 2011/0173050 A1 | 7/2011 | Heyns et al. | |
| 2011/0191263 A1 | 8/2011 | Torre et al. | |
| 2011/0252163 A1 | 10/2011 | Villar et al. | |
| 2011/0301926 A1 | 12/2011 | Chussil | |
| 2012/0005144 A1 | 1/2012 | Cutler et al. | |
| 2012/0054225 A1 | 3/2012 | Marwah et al. | |
| 2012/0166459 A1 | 6/2012 | Ritter et al. | |
| 2012/0198368 A1 | 8/2012 | Bornheimer et al. | |
| 2012/0278213 A1 | 11/2012 | Bristow et al. | |
| 2013/0110473 A1 | 5/2013 | Cantu | |
| 2014/0032482 A1* | 1/2014 | Dulaney | G06F 17/2229 707/607 |
| 2014/0096041 A1 | 4/2014 | Gowen et al. | |

OTHER PUBLICATIONS

International Search Report and Written Opinion, dated Apr. 28, 2014, PCT/US2013/077214 (15 pages).

European Office Action for Application No. 14197988.0 dated Mar. 26, 2018, 8 pages.

Burckhardt, Sebastian et al., "Two for the Price of One: A Model for Parallel and Incremental Computation", SIGPLAN Not. 46, 10, Oct. 22-27, 2011, pp. 427-444.

* cited by examiner

Application

[Home] [Accounts] [Quotes] [Reports] [More]

MacBook Pro 13 in

Overview | Configuration | Specifications ← 122

← 124

Laptops > Macbook Pro

ID#12345

Description

MacBook Pro is ready for anything. It has the processing power, graphics performance, and high-speed I/O you need for advanced photo editing, music composition, HD movie editing, 3D games, and more.

Quantity: [1]   $1,199

[Configure] ← 118

[Add to Quote] ← 120

Application

[Home] [Accounts] [Quotes] [Reports] [More]

Macbook Pro 13 in

Overview  Configuration  Specifications

— 210

Hardware — 206

Software

Office for Mac Home and Student
Office for Mac is more powerful and easy to use. It lets you easily create high-impact documents and seamlessly share your ideas with others.
» More ○ None
○ Office for Mac Home and Student 2011   [$139.95]   212

Service and Support

Protection Plan
For up to three years from your computer's original purchase date, the protection plan gives you direct, one-stop access to telephone technical support for questions about hardware, Mac OS X, iLife, and iWork.
» More

208

As Configured                » Full Detail
Total One Time Price: $1,199

[Add to Quote]

Macbook Pro 13 inch:      $1,199
                                        216

Application

[ Home ]  [ Accounts ]  [ Quotes ]  [ Reports ]  [ More ]

New Quote ( Draft ) Created: December 1, 2012
» Show More ( Catalog )

*Search Products to Add*

| # | Products | List Price | Adjustment | Qty | Final Price |
|---|----------|-----------|------------|-----|-------------|
| 1 | Macbook Pro 13 in | $1,880 | — 304 | 1 | $1,880 |
|   | Macbook Pro 13 in | $1,199 | - | 1 | $1,199 |
|   | 8GB 1600MHz DDR3 SDRAM: | $100 | - | 1 | $100 |
|   | 128GB Solid State Drive: | $200 | - | 1 | $200 |
|   | Apple Thunderbolt Cable(0.5M): | $29 | - | 5 | $145 |
|   | Apple TV: | $99 | - | 2 | $198 |
|   | Apple Remote: | $19 | - | 2 | $38 |

302 →

Summary

Macbook Pro 13 inch:  $1,199
8GB 1600MHz DDR3 SDRAM:  $100
128GB Solid State Drive:  $200
Apple Remote x 2:  $38
Apple Thunderbolt Cable (0.5m) x 5:  $145
Apple TV x 2:  $198

Total Price:  $1,880

Application

[Home] [Accounts] [Quotes] [Reports] [More]

New Quote [Draft]  Created: December 1, 2012
▼ Show More

[Search Products to Add]  [Catalog]

| # | Products | List Price | Discount | Qty | Final Price |
|---|---|---|---|---|---|
| 1 | Macbook Pro 13 in | $1,880 | $282.00 | 1 | $1,598.00 |
|  | Macbook Pro 13 in | $1,199 | - | 1 | $1,019.15 |
|  | 8GB 1600MHz DDR3 SDRAM: | $100 | - | 1 | $85 |
|  | 128GB Solid State Drive: | $200 | - | 1 | $170 |
|  | Apple Thunderbolt Cable(0.5M): | $29 | - | 5 | $123.25 |
|  | Apple TV: | $99 | - | 2 | $168.30 |
|  | Apple Remote: | $19 | - | 2 | $32.30 |

← 374

Summary — 375

| Macbook Pro 13 inch: | $1,199 |
|---|---|
| 8GB 1600MHz DDR3 SDRAM: | $100 |
| 128GB Solid State Drive: | $200 |
| Apple Remote x 2: | $38 |
| Apple Thunderbolt Cable (0.5m) x 5: | $145 |
| Apple TV x 2: | $198 |
| Total Price: | $1,880 |
| Total Discount: | $282.00 |
| Final Price: | $1,598.00 |

[✗] Discount amount of $282.00 exceeds limit. You can either reduce the discount or submit the discount for approval. — 376

[Submit for Approval] ← 377

| # | Product | List Price | Adjustment | Qty | Extended Price |
|---|---|---|---|---|---|
| 1 | 15 Product Families or Less | One Time $15,000.00 | ➡ (1.00%) $150.00 | 1 | $14,850.00 |
| 2 | Professional Voice, TV ... | Monthly $315.00 | ⬅ (10.00%) $31.50 | 2 | $693.00 ✗ |
|   | Qty: 2 |  |  |  |  |
|   | Product ID: 163LDR |  |  |  |  |
|   | Category: Memory |  |  |  |  |

One Time List Price $315.00
Adjustment (10.00%) $31.50
Unit Price $346.50

One Time Total $693.00

10.00 %  $ 31.50   [Apply]

| | |
|---|---|
| 5% | $94.00 |
| 10% | $188.00 |
| 15% | $282.00 |
| 20% | $376.00 |
| 25% | $470.00 |

Figure 3J

METHOD AND SYSTEMS FOR EFFICIENT PRODUCT NAVIGATION AND PRODUCT CONFIGURATION

CROSS-REFERENCE TO RELATED APPLICATIONS

The present application claims priority under 35 U.S.C. § 120 to U.S. patent application Ser. No. 14/069,362, filed Oct. 31, 2013, and titled "Simplified Product Configuration Using Table-Based Rules, Rule Conflict Resolution Through Voting, and Efficient Model Compilation", which claims the benefit under 35 U.S.C. § 119(e) of U.S. Provisional Application No. 61/740,816, filed on Dec. 21, 2012, and titled "Nimbus Configurator Architecture", the entire contents of each of which are incorporated herein by reference.

BACKGROUND

The present disclosure relates to efficient product navigation, simplified price adjustment, and product configuration auto-save.

Product configuration technologies are frequently used to customize complex products to meet the needs of individual customers. However, some existing technologies do not provide end-users with an efficient way to navigate a large product configuration having numerous options. For instance, some product configurations can easily have more than 100 options and because these existing technologies are limited to a top down, serialized navigational approach, users often get lost or overwhelmed while scrolling through the large number of pages in an attempt to find the various options that require configuration.

Furthermore, some existing technologies do not provide users with effective solutions for reliably saving and recovering the progress of their product configurations, particularly during an unanticipated event, such as a network drop, time-out, a system crash, etc. For instance, these technologies do not include mechanisms for restoring any changes made by a user on the front end but not reflected on the back end at the time of the event.

In addition, quoting tools provided by various product configuration solutions often provide little or no guidance to sales people for determining discounts for various products or services, such as help in computing the discounts or guidance on which discounts would be appropriate. For instance, sales people using these solutions are often unaware that the discounts they are attempting to apply may not conform to internal policies and/or may impact product margins too heavily. As a result, managers are often needlessly inundated with approval requests that could otherwise have been avoided had the sales people been provided with the proper guidance when attempting to apply the discount.

SUMMARY

According to one innovative aspect of the subject matter described in this disclosure, a system includes one or more processors, a user application, and a price adjustment advisor. The user application and the price adjustment advisor are executable by the one or more processors to perform various acts. For instance, the user application receives a user input requesting to configure a price adjustment for a particular product. For instance, the price adjustment advisor generate a price adjustment advisor interface for the product including a price adjustment calculator having a percentage field for entering a price adjustment percentage and a monetary field for entering a price adjustment amount, and provide the price adjustment advisor interface for presentation to the user.

In general, another innovative aspect of the subject matter described in this disclosure may be embodied in methods that include receiving a user input requesting to configure a price adjustment for a particular product; generating a price adjustment advisor interface for the product including a price adjustment calculator having a percentage field for entering a price adjustment percentage and a monetary field for entering a price adjustment amount; and providing the price adjustment advisor interface for presentation to the user.

Other implementations of one or more of these aspects include corresponding systems, apparatus, and computer programs, configured to perform the actions of the methods, encoded on computer storage devices.

These and other implementations may each optionally include one or more of the following features. For instance, the operations may further include providing a quote interface for quoting a price for a product for presentation to a user; determining one or more discount parameters; that generating the price adjustment advisor interface includes determining a discount threshold based on the one or more discount parameters and generating a margin indicator for the discount threshold indicating whether the discount threshold needs approval from a supervisor; determining a role of the user; determining whether to include one or more of a margin indicator, a discount floor, and a discount level in the interface based on the role of the user; receiving a user input including a price adjustment figure entered via the percentage field or the monetary field; calculating the price adjustment using the price adjustment figure; automatically updating the percentage field or the monetary field not used by the user to enter the price adjustment figure with a figure corresponding to the price adjustment figure; receiving a user input selecting a predetermined amount displayed by the price adjustment advisor interface; and applying a price adjustment to the price of the product using the predetermined amount. For instance, the features may include that the price adjustment figure for the particular product includes a certain percentage or a certain monetary value.

According to yet another innovative aspect of the subject matter described in this disclosure, a system includes one or more processors and an object model management engine. The object model management engine is executable by the one or more processors to perform various acts. For instance, the object model management engine receives a first user input to configure a product; automatically saves progress of a configuration of the product responsive to receiving the user input; updates a quote based on the configuration; detects a system crash or a system timeout; receives a second user input requesting to configure the product; retrieves a bill of material (BOM) and a quote associated with the product; compares the BOM with the quote; if the BOM does not matches the quote, retrieves an automatically saved version of the product configuration; and if the BOM matches the quote, provides a version of the product configuration matching the quote to the user.

In general, yet another innovative aspect of the subject matter described in this disclosure may be embodied in methods that include receiving a first user input to configure a product; automatically saving progress of a configuration of the product responsive to receiving the user input; updating a quote based on the configuration; detecting a system crash or a system timeout; receiving a second user input requesting to configure the product; retrieving a bill of material (BOM) and a quote associated with the product; comparing the BOM with the quote; if the BOM does not match the quote, retrieving an automatically saved version of the product configuration; and if the BOM matches the quote, providing a version of the product configuration matching the quote to the user.

According to yet another innovative aspect of the subject matter described in this disclosure, a method includes receiving a selection of a product; determining a plurality of sections associated with the product; determining one or more option groups for each of the sections, each of the option groups including one or more options for the product; generating a product configuration page including a navigation panel and the plurality of product sections associated with the product, the navigation panel including a plurality of tabs, each tab in the plurality of tabs representing a certain section from the plurality of sections and including one or more indicators corresponding to the one or more option groups included in the certain section, each of the one or more indicators visually indicating whether an option from a corresponding option group has been selected; and providing the product configuration page for presentation to a user.

These and other implementations may each optionally further include one or more of the following features. For instance, the operations may further include receiving a user input; determining the input to be a tab selection selecting a tab from among the plurality of tabs based on the user input; determining which section from the plurality of sections is associated with the tab selected by the tab selection; determining a position of the section associated with the tab selection relative to an optimal viewing position for an active section; repositioning the section associated with the tab selection to the optimal viewing position; receiving a user input; determining the user input to be a hover action; determining which tab from the among the plurality of tabs is being hovered; displaying descriptive information for the one or more indicators included in the tab being hovered; receiving a user input; determining the user input to be an option selection; and updating a visual indicator included in the navigation panel for the option group to indicate that an option from the option group has been selected if no option from the option group was previously selected.

For instance, the features may include that the descriptive information includes a section title of the section associated with the tab and the one or more option groups associated with the one or more indicators; and that the one or more indicators visually indicate whether any option or options from the one or more option groups have been selected.

According to yet another innovative aspect of the subject matter described in this disclosure, a computer-generated interface for configuring a product includes a plurality of sections associated with a product, each of the sections including one or more option groups containing one or more options selectable to configure the product; and a navigation panel including a plurality of tabs, each tab in the plurality of tabs representing a certain section from the plurality of sections and including one or more indicators corresponding to the one or more option groups included in the certain section, each of the one or more indicators visually indicating whether an option from a corresponding option group has been selected.

These and other implementations may each optionally further include one or more of the following features. For instance, the features may further include that the one or more indicators visually indicate whether any option or options from the one or more option groups have been selected; and that at least one indicator of the one or more indicators indicates that a corresponding option group has none of the options included in option group selected, and the indicator is updated to indicate that at least one option from the corresponding option group has been selected upon user selection of the at least one option.

It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

FIG. 1B is a graphical representation of an example product interface, which includes an overview, configuration details, and specifications for a selected product.

FIGS. 2A-2E are graphic representations of various example product configuration interfaces for configuring a product.

FIGS. 3A-3J are graphic representations of example user interfaces for quoting a product and entering a price adjustment.

DETAILED DESCRIPTION

Figure 1A:
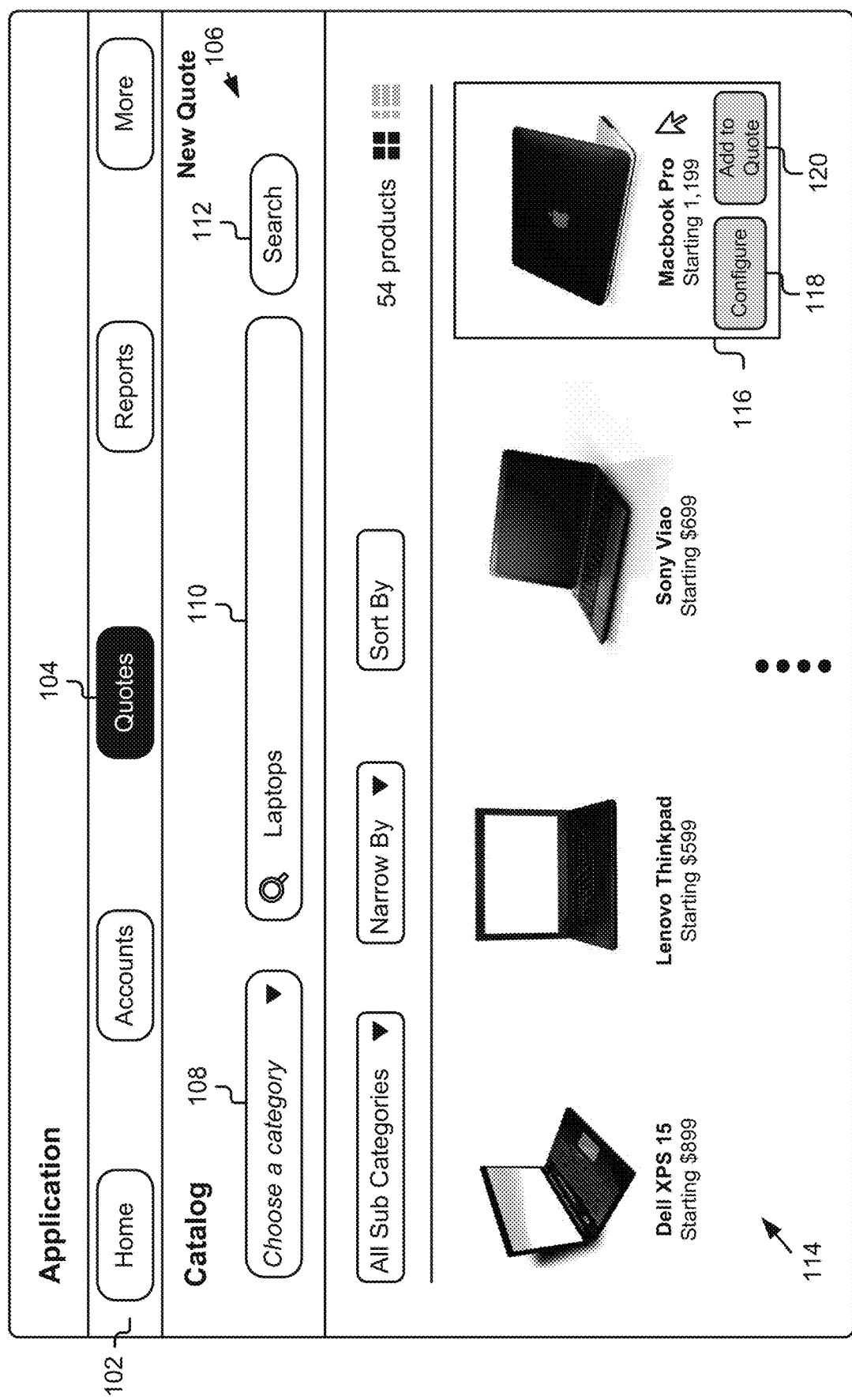
FIG. 1A is a graphical representation of an example user interface for configuring and quoting products.

FIG. 1A is a graphical representation of an example user interface 100a for configuring and quoting products. A product is generally any offering that can be sold. In addition to its plain meaning of a physical item or service, a product may be an item that is a configuration of other physical products or services and/or or virtual products or services. In the depicted example, a user can configure and add a laptop computer to a quote, although it should be understood that the interface 100a is applicable to configuring or quoting any product or service. The user interface 100a includes a menu region 102, a catalog region 106, and a products region 114. The menu region 102 includes one or more menu buttons for navigating between different interfaces offering various different functionality, such as, but not limited to, a home interface, an accounts interface, a quotes interface, a reports interface, etc. As depicted, the menu button representing quotes 104 was selected, which signaled a user application 508 (see FIG. 5) to render the user interface 100a for configuring and quoting a product.

The catalog region 106 includes a selector 108 (e.g., dropdown menu) for selecting a product category (e.g., computers, office products, electronics, etc.), a search field 110 for entering one or more search parameters (e.g., the word "Laptops"), and a search button 112 for submitting a search query using the product category and one or more search parameters. The product region 114 includes one or products returned by the system 500 (see FIG. 5) and displayed by the user application 508 (see FIG. 5) responsive to receiving the search query entered in the search field 110 of the catalog region 106. Product 116 (e.g., a MacBook Pro Laptop), which is shown as highlighted, is being hovered over using an input device of a user's device (e.g., user device 506 shown in FIG. 5). In response to hovering, the user application 508 displays a configuration button 118 selectable to configure the product 116 and an add-to-quote button 120 selectable to add the product 116 to a quote as pre-configured. User selection of the product 116 (e.g., a hyperlink including the image or descriptive text of the product 116) may request the display of the interface 100b depicted in FIG. 1B and user selection of the configure button 118 may request the display of the interfaces depicted in FIGS. 2A-2E. User selection of the add-to-quote button 120 may request the display of additional interfaces (not depicted) for managing and completing a quote for the product 116.

FIG. 1B is a graphical representation of a product interface 100b, which includes an overview, configuration details, and specifications for the product 116 in FIG. 1A. In particular, the interface 100b includes a product navigation region 122 for accessing different information associated with the product, such as an overview, configuration details, specifications, etc. In the depicted embodiment, an overview panel 124 is selected, which includes a product ID, a description, a quantity field, a price, and the configure button 118 and add-to-quote button 120 described above with respect to FIG. 1A. User selection of the configure button 118 may direct the user to the interfaces depicted in FIGS. 2A-2E.

FIGS. 2A-2E are graphic representations of various example product configuration interfaces for configuring a product, such as the product 116 from FIGS. 1A and 1B. In the depicted embodiments, these interfaces includes various elements that are the same or substantially similar to those described above with respect to FIGS. 1A and 1B, and the description of those elements will not be repeated here.

Figure 2B:
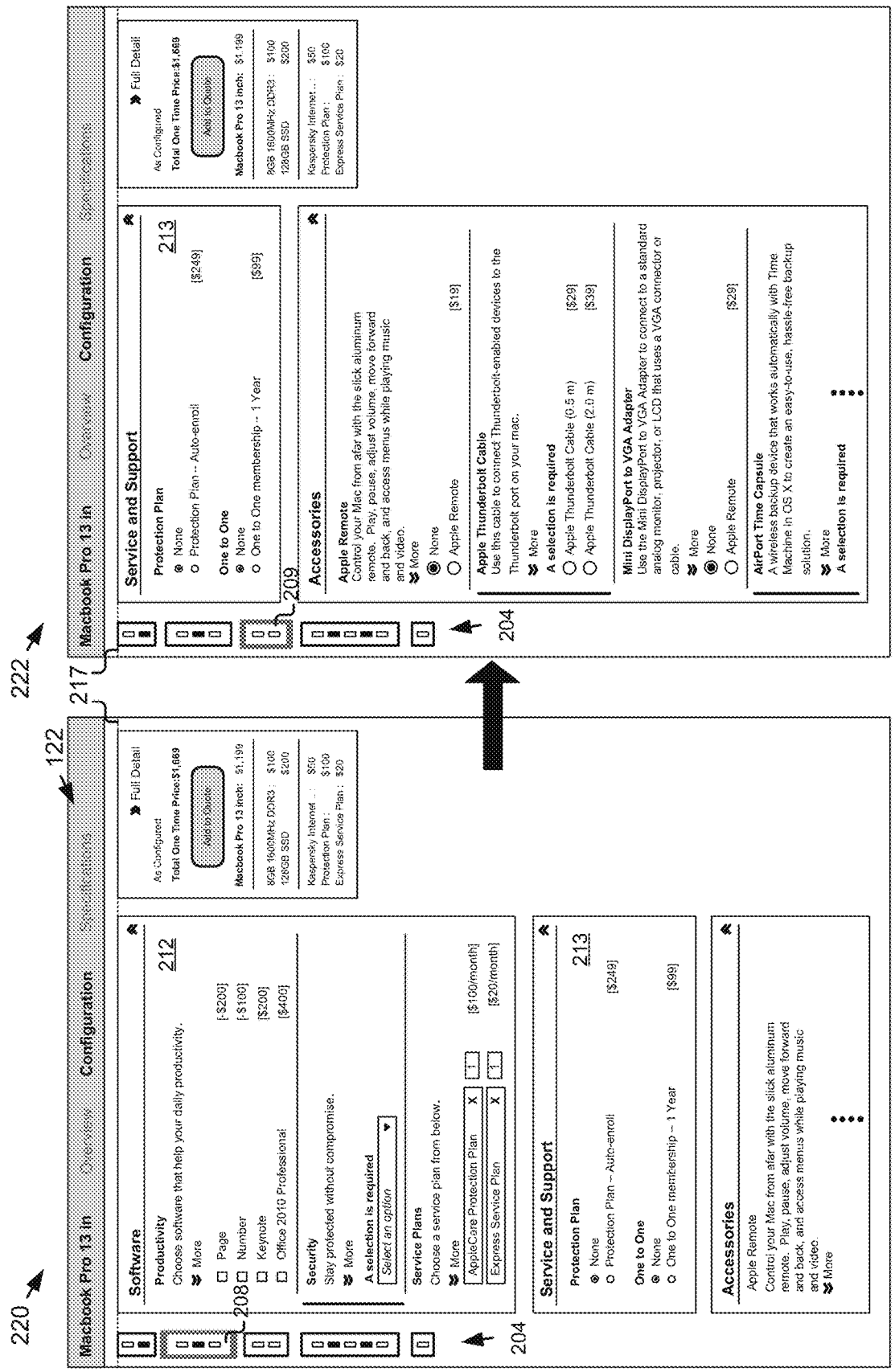
Figure 2C:
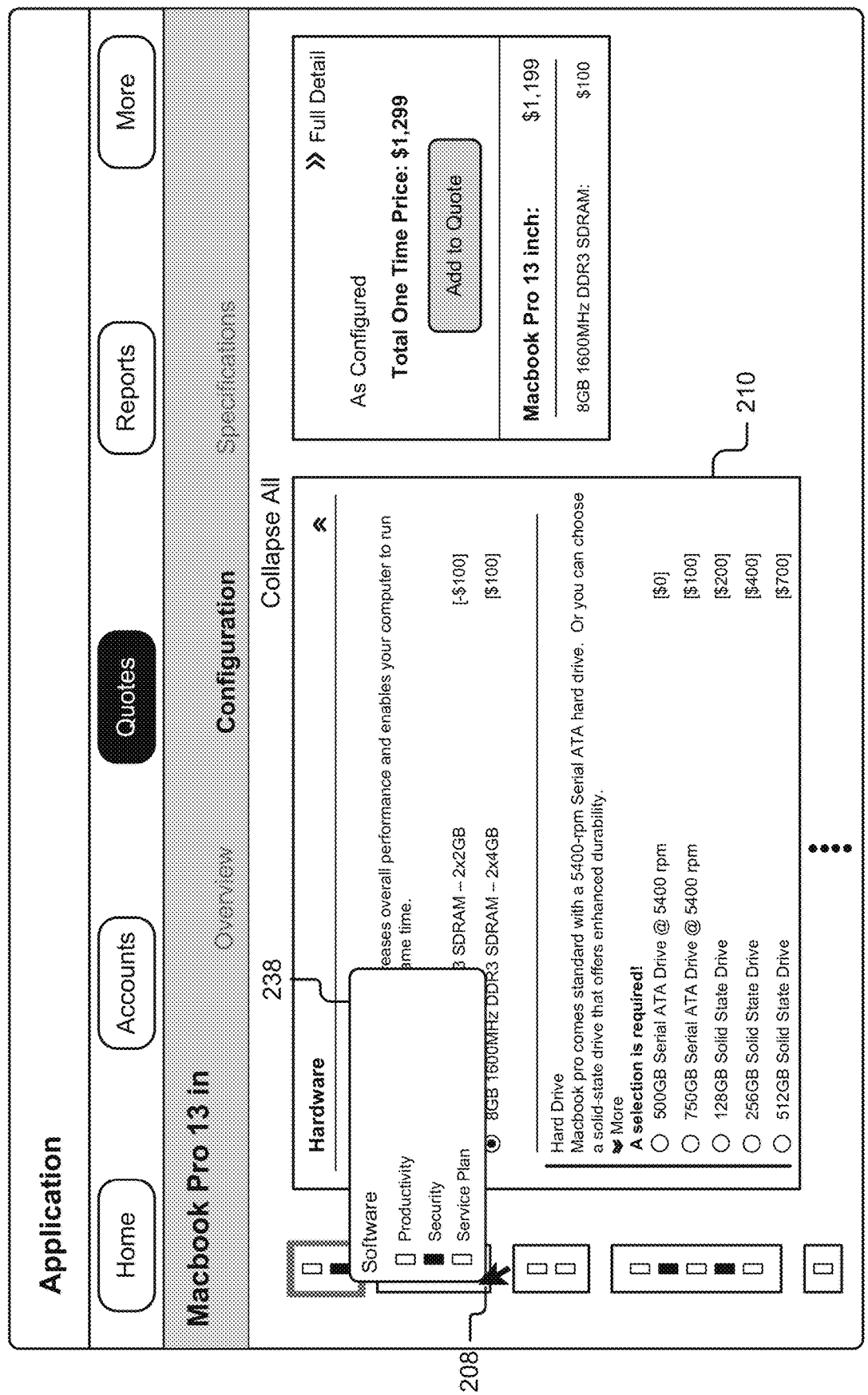
Figure 2D:
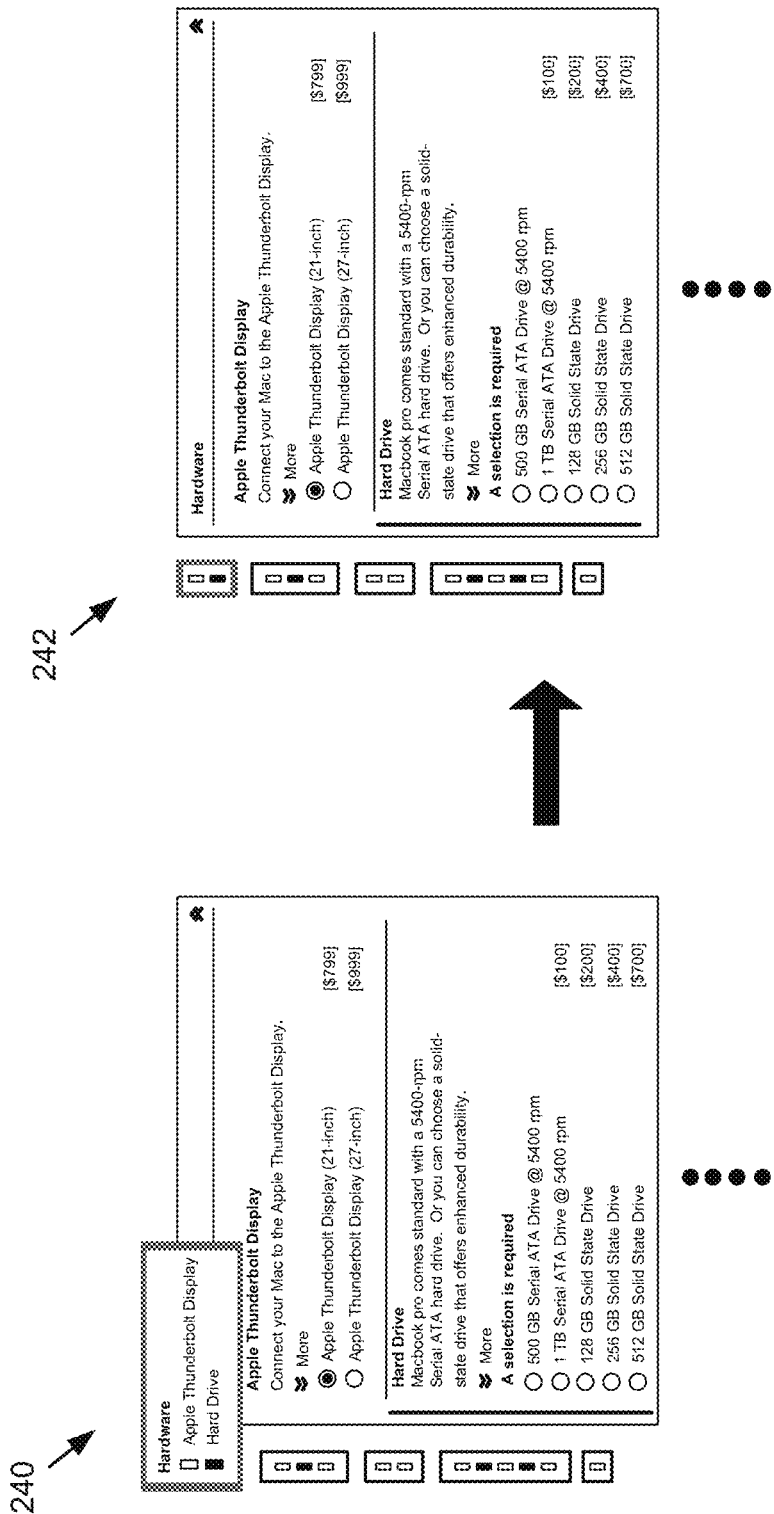

The example interface 200 in FIG. 2A includes a navigation panel 204, a section region 214, and a summary region 216. The navigation panel 204 includes a plurality of tabs, such as tab 206. The tabs in the navigation panel 204 respectively represent the sections included in the section region 214. For instance, tab 206 is representative of the hardware section 210, tab 208 is representative of section 212, and so on. Each section in the section region 214 is expandable and collapsible by selecting (e.g., tapping, double clicking, etc.) on a header region of the section. For instance, selecting the header region labeled Hardware of section 210 expands that section to show the options groups comprising that section (e.g., as shown in FIG. 2C). The summary region 216 includes a summary of the various configurations performed for the product 116 using the interfaces depicted in FIGS. 2A-E. For instance, the summary region 216 includes a summary of the options included in the product, a price for the product, and an add-to-quote button, etc.

As shown in FIG. 2B, using the navigation panel 204, a user can quickly and conveniently navigate to different sections of the section region 214 that need addressing. For instance, the navigation panel 204 acts as a high-level graph including elements that automatically depict any problems with the product configuration and the locations of these problems (e.g., the sections that need completing, have a conflict, have been improperly completed, etc.). In some embodiments, the navigation panel 204 may be fixed relative to the rest of the scrollable content in the interface so the user can always reference it without having to perform any user action, although other configurations are also contemplated.

For instance, to navigate from the second section, section 212, to the section 213, a user may select the third tab, tab 209, and in response the navigation module 624 (e.g., see FIG. 6B) may receive the navigation input, determine whether the corresponding section 213 is in the optimal viewing position, such as whether a top border is aligned with a reference line 217 of the interface 200. If not, the navigation module 624 can reposition (e.g., scroll) the section associated with the selected tab into the optimal viewing position, as shown by the transition between views 220 and 222. For instance, the navigation module 624 can scroll the service and support section 213 up into the vertical position of the software section 212, and scroll the software section 212 upward out of view (e.g., via a visual effect that hides the software section 212 as it scrolls past the navigation region 122). In some embodiments, the tab corresponding to the section located in the optimal viewing position (e.g., tab 208 in view 220 and tab 209 in view 222) is highlighted (e.g., bolded, colored, shadowed, etc.) by the navigation module 624 to visually indicate to the user which section is currently located in the optimal (e.g., most prominent to the user) viewing position.

Each tab in the navigation panel 204 includes one or more indicators that correspond to the one or more option groups included in the section associated with that tab. Descriptive information about the indicators can be quickly accessed by interacting with the tab (e.g., hovering over the tab with an input device), as shown in FIG. 2C. For instance, as depicted in the FIG. 2C, a user may hover over the tab 208 using a pointer device (e.g., trackpad, mouse, etc.), and in response, the pop-up dialog 238 may be displayed that includes a section title (in this case "Software"), the indicator(s) and the title(s) (in this case "Productivity", "Security", and "Service Plan") of the options groups of section 212 to which the indicator(s) correspond. The dialog 238 may in some cases be supplemental to the tab 208 that it is associated with or may be an expanded version of the tab 208. As a further example, the navigation module 624, which may be configured to listen for various user input provided by the user when using the user application 508, may detect a hover action associated with tab and in response display additional descriptive information to the user about the indicator(s) included in that tab, such as information about number of errors and/or the types of errors that are present in current configuration, etc. In some embodiments, upon page load an expanded view showing the indicator(s) and the descriptive information may be initially be displayed by the navigation module 624 for the top tab of the navigation panel, as depicted in view 240 of FIG. 2D, and after a predetermined amount of time may be hidden from view to show the collapsed view depicted in view 242 of FIG. 2D.

As shown in FIGS. 2A-2E, the indicators included in the navigation panel 204 provide a convenient snapshot of all the items that still need to be completed by a user, thereby alleviating the user from having to scroll through all of the individual sections associated with the product to determine whether the items in those sections have been completed. This can save the user a significant amount of time, particularly when the user is configuring a complex product that includes numerous sections (e.g., 10, 25, 50, 100+, etc.).

When a user selects or unselects various options from the sections in the section region 214, the navigation module 624 can capture those selections and update the visual indicators in the navigation panel 204 to reflect which items (e.g., option groups) have been completed and which items still need to be completed by the user. As depicted, each indicator included in each tab of the navigation panel 204 may be coded to visually indicate whether the option group to which the indicator corresponds has not yet been filled in by the user. For instance, a red indicator may indicate that the user must make a selection from a corresponding option group, a gray bar may indicate that the corresponding option group does not require a selection, that the system made a default selection, that the user has already made a selection, etc., differently colored indicators (green vs. gray) could be used to distinguish between user-made selections and default and/or system-made selections, etc. The visual coding may include using different colors, patterns, shapes, images, text, etc., indicating the completion state of the option group. For instance, the visual indicators may include a graphical image (e.g., raster-based, vector-based, etc.) having one or more colors, patterns, shapes, text, etc. In some embodiments, the interface 200 may include a legend indicating the meaning of the different visual indicators being used. In further examples, multiple different indicators (e.g., tiers of coloring) may be used for the indicators to indicate different statuses (e.g., conflicts between options, unavailability of options, required option groups that have not been completed, option groups properly configured, user-selection option versus a system selected default, auto-selected option, etc.).

Figure 2E:
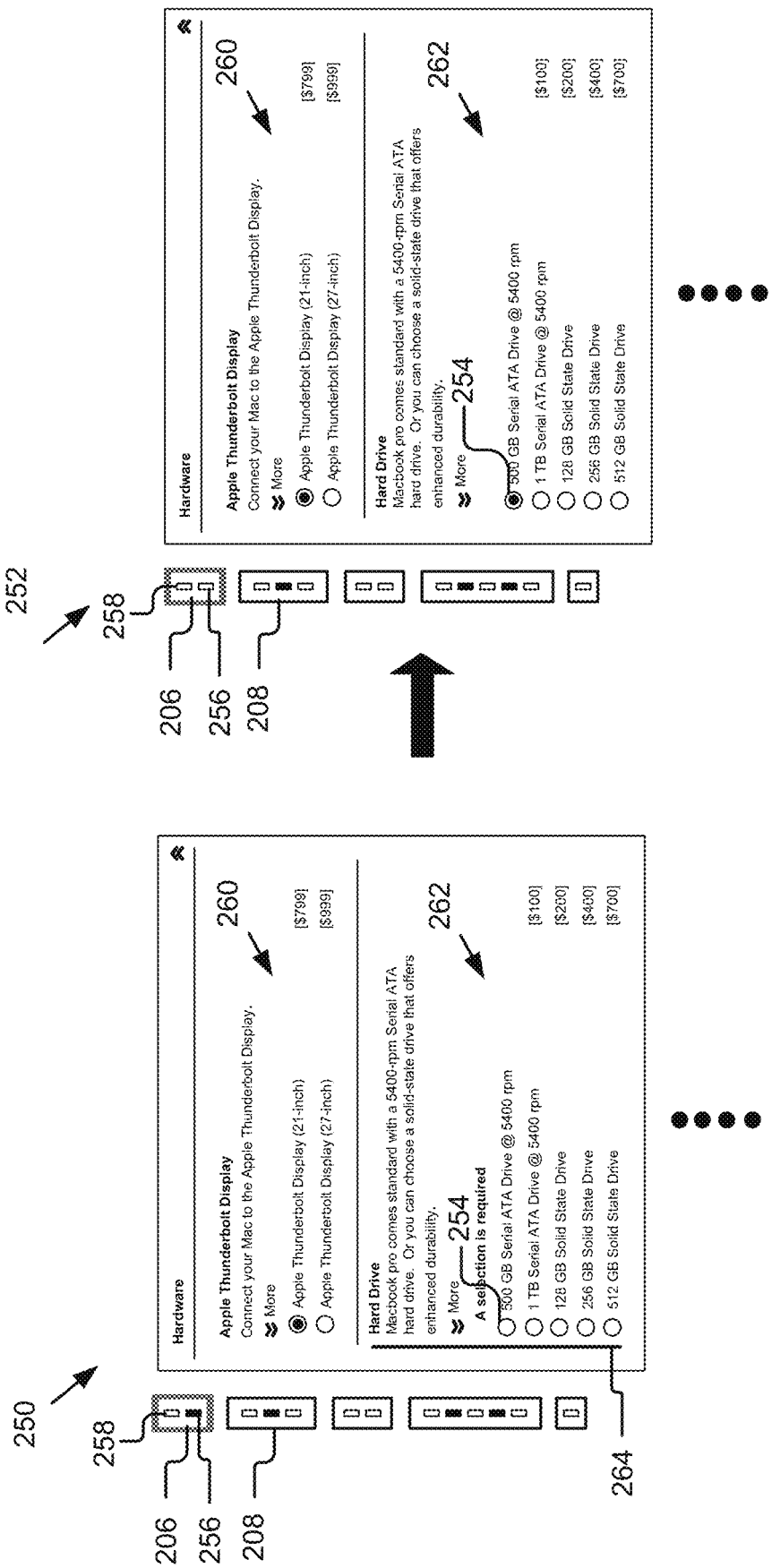

By way of further example, as shown in view 250 of FIG. 2E, the tab 206 includes two graphical indicators, 256 and 258. The indicator 258 is neutrally colored to indicate that the first option group 260 has been filled in. For instance, a user (or the system 500) has selected an option (e.g., a radio button corresponding to the 21 inch Apple Thunderbolt Display) from the list of options in the option group 260. The indicator 256 has a darkened color to indicate that the second option group 262 has not yet been filled in. For instance, the user has not yet selected an option from the list of options in the group 262.

In contrast, in view 252, the navigation module 624 has updated second indicator 256 with a neutral color indicating that the second option group 262 has now been completed by virtue of a user selection of the first element 254 in the list of options forming the option group 262 (e.g., the 500 GB hard drive option). In some embodiments, the section may include a warning indicator 264 proximate to any incomplete option groups so the items that need completion are readily apparent to the user. As with the corresponding visual indicator, the warning indicator 264 may also be removed from display once one or more options from the option group with which it is associated has been selected, as shown in view 252. While the depicted embodiments include two different variations of visual indicators (e.g., neutral and dark), it should be understood that number of variations may be included.

Figure 3C:
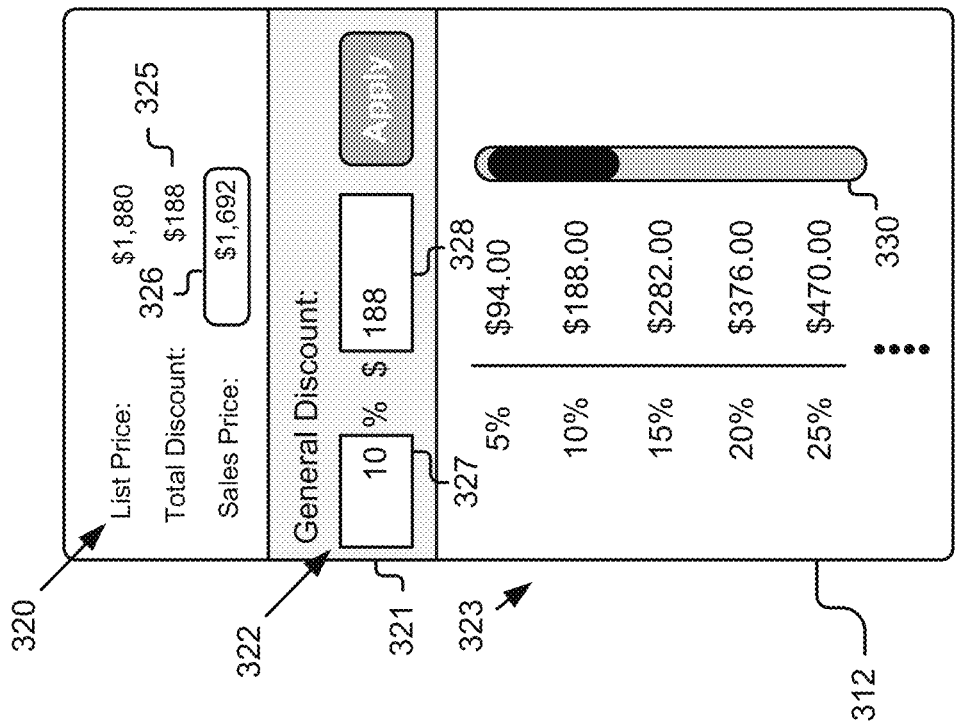

FIGS. 3A-3J are graphic representations of example user interfaces for quoting a product and entering a price adjustment. With reference to FIG. 3A, an example user interface 300 for quoting a product is shown. The user interface 300 includes a summary table 302 describing the configured product 116 discussed above with reference to at least FIG. 1A, and a user-selectable price adjustment field 304 that, when selected, prompts the display of a price adjustment advisor interface 312, various examples of which are depicted in FIGS. 3B-3F. It should be understood that the price adjustment advisor interface 312 is not limited to elements depicted in FIGS. 3B-F and may additionally or alternatively include other elements, such as a price adjustment (e.g., discount) history field that provides a user (e.g., sales representative) information about prior discount(s) that were given to a customer for which the quote is being prepared. The price adjustment advisor interface 312 can further include an average discount field for depicting the average discount that is given to customers for a particular product. Further, it should be understood that while various examples described with reference to the figures are described within the context of computing a price discount, these examples are also applicable for computing a price markup.

Figure 3B:
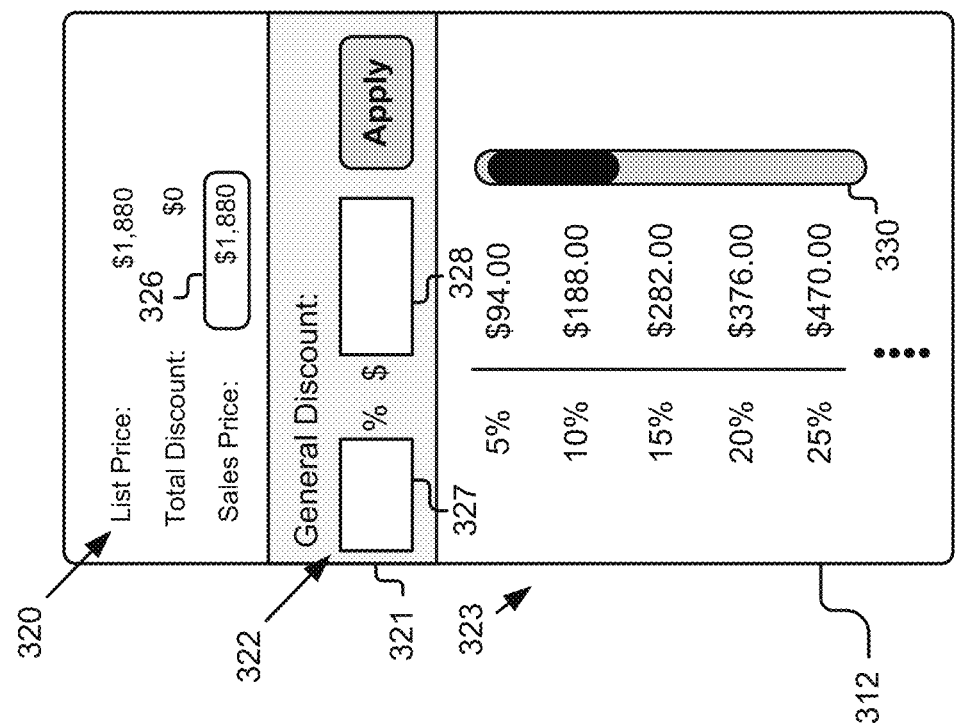

The price adjustment advisor interface 312 provides users with a convenient tool for quickly determining a suitable price adjustment (e.g., discounts, markups, etc.) for the products being configured and quoted by the user. As shown in FIGS. 3B and 3C, the price adjustment advisor interface 312 may include a header region 320, a general discount region 321 having a price adjustment calculator 322, and a predetermined discount region 323. The header region 320 may include product-related information such as current pricing information for the product 116. The current pricing information may include, but is limited to, a list price, a total discount, and a sales price. The header region 320 can also include supporting information, such as a suggested floor price and a suggested max price, for the user in order to help him/her enter the discount for the product 116.

The price adjustment calculator 322 may include various fields for entering a discount for the product 116. In some embodiments, these fields include a percentage field 327 for entering a discount (or markup) percentage and a monetary field 328 for entering a discount amount (or markup) using a certain monetary value. This is advantageous as the user can elect to enter the discount in terms of either a percentage or a monetary value. For instance, a user could enter 10% in percentage field 327 and the price adjustment advisor 622 (see FIG. 6B) backing the interface 312 can automatically compute and populate any other dynamically linked fields, such as the percentage field 327, the sales price field 326, and the total discount field 325, with corresponding values. Alternatively, the user could enter $188 in the discount monetary value field 328 and the price adjustment advisor module 622 can automatically compute and populate the percentage field 327, the total discount field 325, and the sales price field 326 with their corresponding values. In a further example, the user could enter an overall sales price in the sales price field 326 and the price adjustment advisor module 622 can automatically compute and populate the percentage and monetary value fields 327 and 328 with corresponding values. The pre-determined discount region 323 may include a scrollable list of pre-determined discount percentages and their corresponding discount amounts, from which, a user can select a discount percentage/amount by scrolling up or down the list using a scroll bar 330, and the price adjustment advisor 622 can then automatically update the percentage field 327, the monetary value field 328, the total discount field 325, and the sales price 326, as described elsewhere herein. This is advantageous as it may save the user time by not having to manually compute these values.

Figures 3D, 3E:
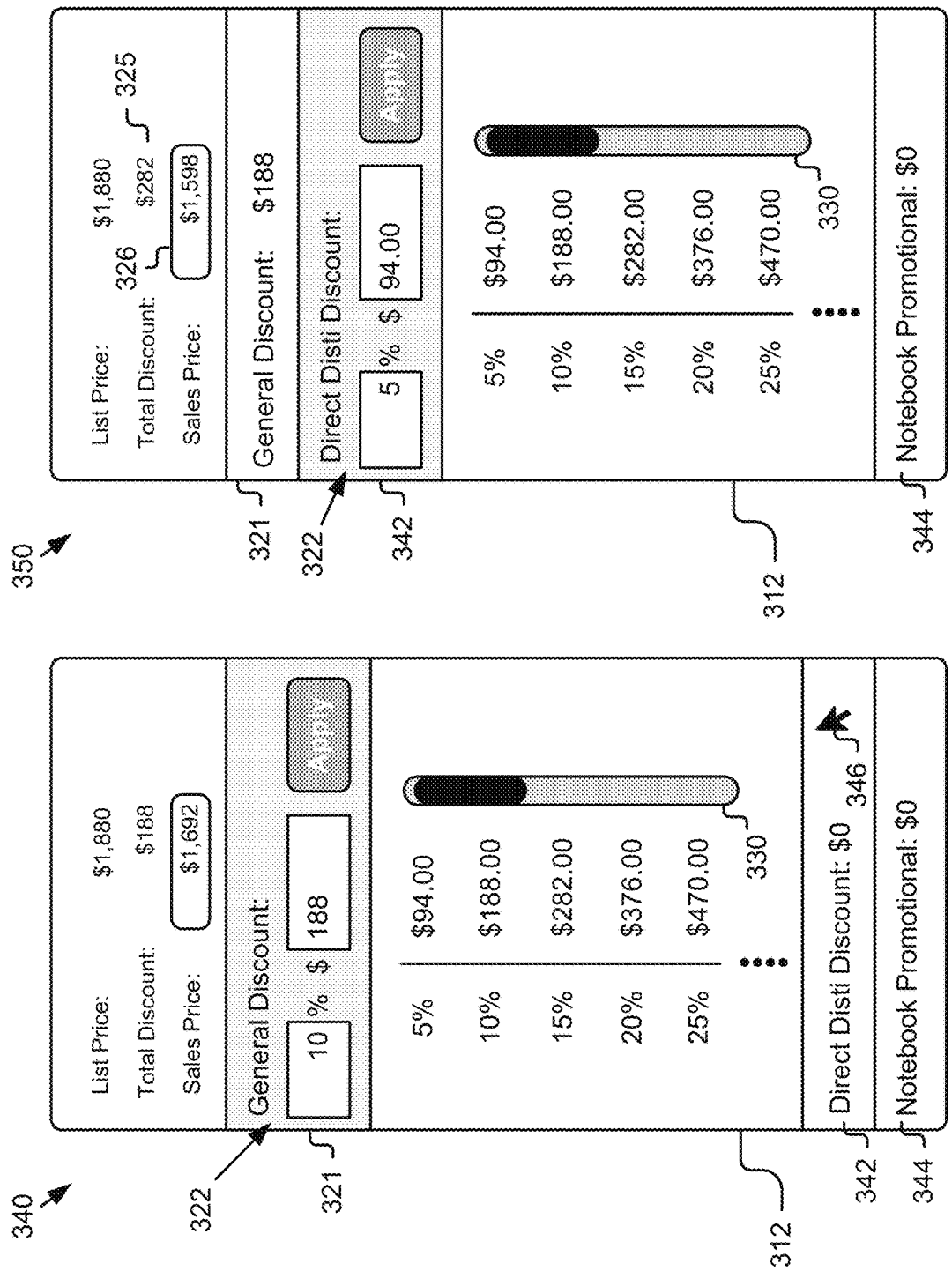

FIGS. 3D and 3E depict further examples of the price adjustment advisor interface 312. In these examples, regions for a plurality of discount types that are applicable to the product 116 may be included in the interface 312 and the user may compute the discount for each type separately using a corresponding price adjustment calculator. For instance, in view 340, the general discount region 322 is depicted as open and regions for other discount types, such as a direct distributor discount type 342 and a promotional discount type 344, may be accessed by selecting the region in the interface corresponding to that type. In response to the selection, the price adjustment advisor 622 may collapse the display of the general discount region 322 and open the selected region, such as the direct distributor discount region 342 as depicted in view 350. When expanded, the interface 312 may be updated to include an instance of the calculator 322 in the direct distributor discount region 342 for calculating and applying a related discount. Once applied, the interface 312 is updated to reflect the discount. For instance, the price adjustment advisor 622 receives the discount entered and applied by the user using the calculator, adds it to any other discounts entered for the other discount types (e.g., general discount, promotional discount, etc.), and updates the total discount 325 and sales price field 326 based on the cumulative values computed by it. It should be understood that the examples depicted in FIGS. 3B-F are not limited to receiving discounts in any one particular currency (e.g., US dollars in this case) and may be capable of accommodating other currencies. For instance, a user may enter €136.61 in the discount amount field 328 and the price adjustment advisor 622 may automatically convert and update the fields 327, 325, 326, etc. to reflect the corresponding discount. Moreover, the interface 312 is not limited to receive only positive discount amounts/percentages and can receive negative discount amounts/percentages as well. By way of example, a user can enter −5% as uplift to the product list price instead of a discount, as discussed in further detail herein with respect to at least FIG. 3J.

Figure 3F:
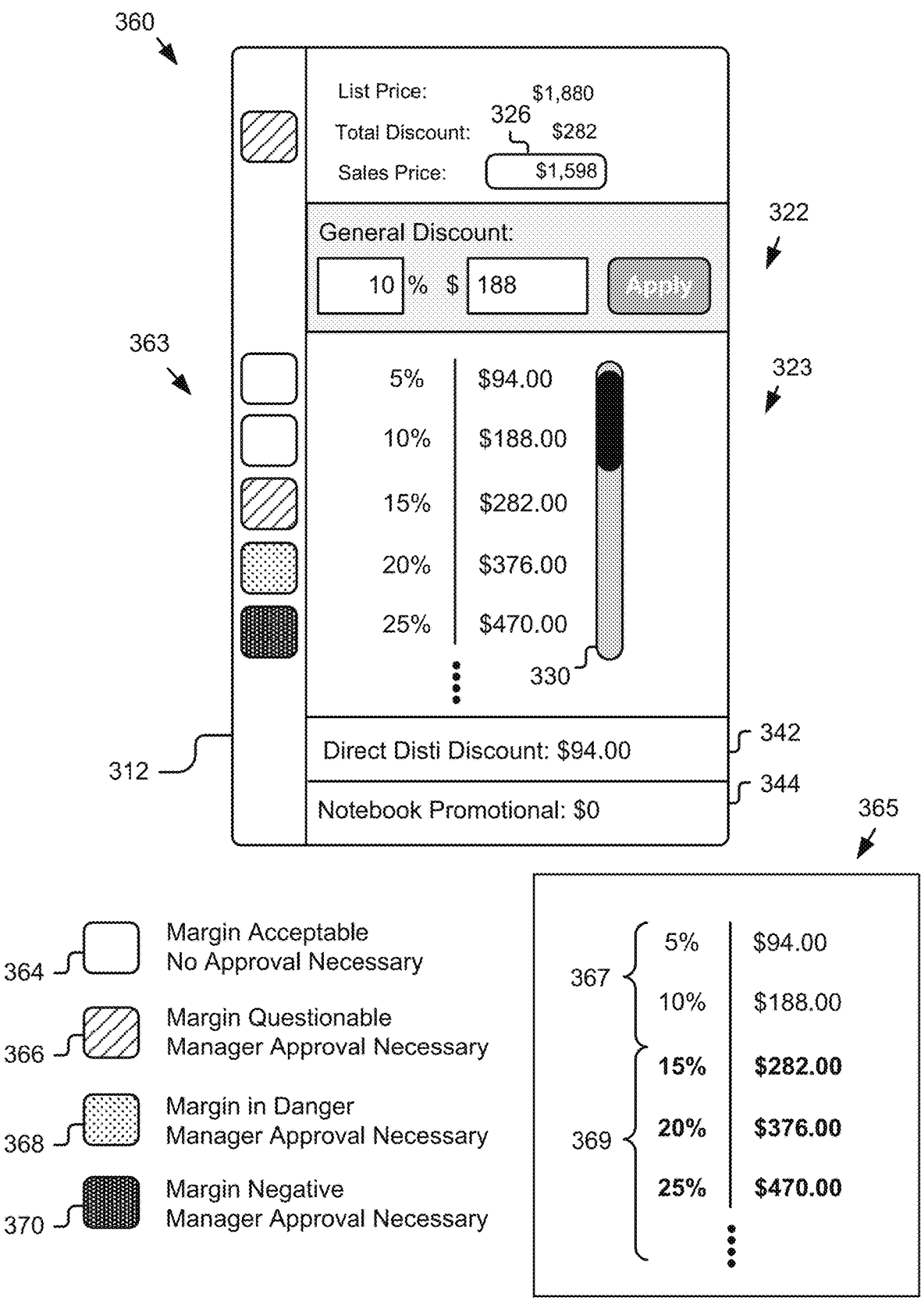

FIG. 3F depicts a further example of the price adjustment advisor interface 312 equipped with one or more margin indicators generated for display by the price adjustment advisor 622. A margin indicator may indicate whether a given discount amount is within an allowable range or requires approval from a supervisor. It should be understood that the margin indicator(s) may include any form suitable for visually communicating the permissibility of the discount amount(s) including, for example, color highlighting, colored lines, text highlighting, etc. Two different examples of margin indicators are depicted in FIG. 3F. In the first example, the margin indicator(s) comprise one or more tiles placed adjacently to total discount being applied and/or the pre-computed/determined discount levels displayed in region 323 as indicated by reference numerals 360 and 363, respectively. The tile 364 indicates that the product margin at the corresponding discount level is within the pre-approved threshold and does not require manager approval. The tiles 366, 368, and 370 indicate that the product margins at the corresponding discount levels require manager approval because, in increasing order, they exceed the pre-approved threshold. It should be understood that the margin levels indicated by tiles 364-370 are only examples and that other different levels such as multiple approval levels (e.g., VP approval required) can also be included. In the second example, the interface may highlight amount(s) displayed in the interface using various markups to indicate whether the amount(s) are acceptable. For instance, the pre-determined amounts 365, which are includable in the predetermined discount region 323, may be displayed as ordinary black text if they are compliant with a pre-approved discount threshold and highlighted (e.g., bolded, colored, etc.) if they are not. In further examples, the fields 326, 327, 328, and 325, etc., or the text included therein, may themselves be annotated (e.g., colored, highlighted, filled, etc.) to indicate whether they are within or exceed a pre-determined discount threshold. It should be understood that the above examples of margin indicators are intended to be illustrative and that other variations are also possible and encompassed by the present disclosure. For instance, different margin indicators may be provided to certain users based on their roles. By way of example, margin information may be shown to pricing users but may be hidden to sales representatives.

The margin indicators provide numerous advantages including, but not limited to, helping users make an informed decision about what discounts to apply while also enforcing pricing policies set by their businesses/organizations, and saving the users time by not having to guess what an acceptable discount would be. It can also save supervisors time when reviewing discount approval requests by reducing the total number of approval requests that are submitted by the users he/she supervises because those users lack of information about what discounts are acceptable, and by largely eliminating approval requests by users asking for discounts that would produce a negative or otherwise unsustainable margin.

Figure 3H:
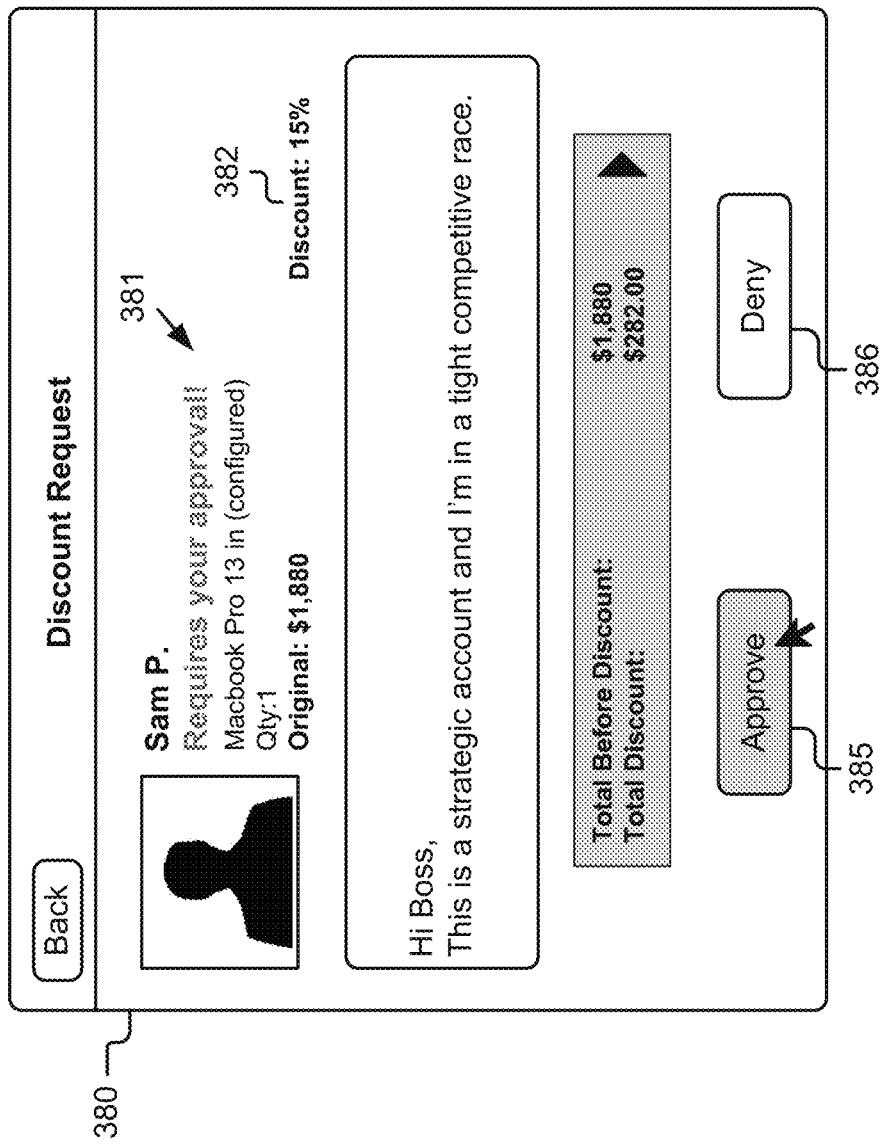
Figure 3I:

FIGS. 3G-I depict example interfaces for submitting a discount for approval, approving a discount, and finalizing a quote. Once the discount has been entered using the price adjustment advisor interface 312 and that interface has been closed, the discount amount computed using the price adjustment advisor interface 312 may be reflected in the interface 300 by the price adjustment advisor 622, as shown in FIG. 3G by reference numerals 374 and 375. If the discount exceeds the pre-approved threshold, the price adjustment advisor 622 may also display a notification 376 to the user indicating that the discount exceeds the pre-approved threshold and requires approval, along with an approval button 377 for requesting approval. In response to a user selection of the approval button 377, the user application 508 may generate and send an approval request to the configuration system 516 (see FIG. 5), which may then determine the identity of the user's supervisor and send the approval request to the supervisor for approval. An example interface 380 for approving such a request is depicted in FIG. 3H, which includes information about the discount as indicated by reference numerals 381 and 382, and an approve button 385 and a deny button 386, which, when selected, trigger the submission of an approval response to the configuration system 516 that approves or denies the request. Once approval has been provided, the configuration system 516 may notify the user of the approval (e.g., as shown by notification 390 in FIG. 3I, asynchronously, in the HTML forming the interface 300, via a messaging tool associated with the interface 300, another mechanism, etc.) and the user may proceed to send the quote to the customer requesting it.

FIG. 3J depicts an example table 392 for making price adjustments (e.g., discounts, markups, increase price, etc.) to various products. The table 392 may be included in a product-configuration interface, such as the interface 300 discussed elsewhere herein, and may include one or more rows of products that have been configured and/or quoted. The user may use the interface 392 to quickly make adjustments to the prices of multiple products included in the table 392. For instance, to make a price adjustment (e.g., increase/decrease price) to the product depicted in row #2, the user may select the adjustment field 394, and in response, the price adjustment advisor 622 may display a dropdown menu including the price adjustment advisor interface 393 for configuring the price adjustment. The price adjustment advisor interface 393 includes elements 322, 327, and 328 having the same or substantially attributes as those discussed elsewhere herein with reference to the price adjustment advisor interface 312. As with interface 312, a user may use the interface 393 to input a price adjustment in terms of a percentage or a monetary amount and apply the discount by pressing an apply button. Responsive to this, the price adjustment advisor 622 may close the interface 393 and refresh the interface 392 to include the price adjustment. In another example, the user may select a predetermined discount figure (e.g., 5%, 10%, $94.00, $188, etc.) depicted in region 323, and the price adjustment advisor 622 may close the interface 393 and apply the discount in the pricing fields included in row #2. In some embodiments, a user (e.g., a sales representative) can enter a unit price in the unit price field 395 and the price adjustment advisor 622 may automatically update the adjustment field 394 based on the price entered in unit price field. The vice-versa of this is also true. The interfaces 392 and 393 may also include an adjustment indicator 396 describing whether the adjustment that is being applied/has been applied is an upward or downward adjustment relative to the list price of the product. The price adjustment advisor 622 may trigger the display of the adjustment indicator 396 once an adjustment amount has been input by the user. It should be understood that the interfaces 392 and 393 may be configured to receive and reflect positive or negative adjustments.

Figure 4:
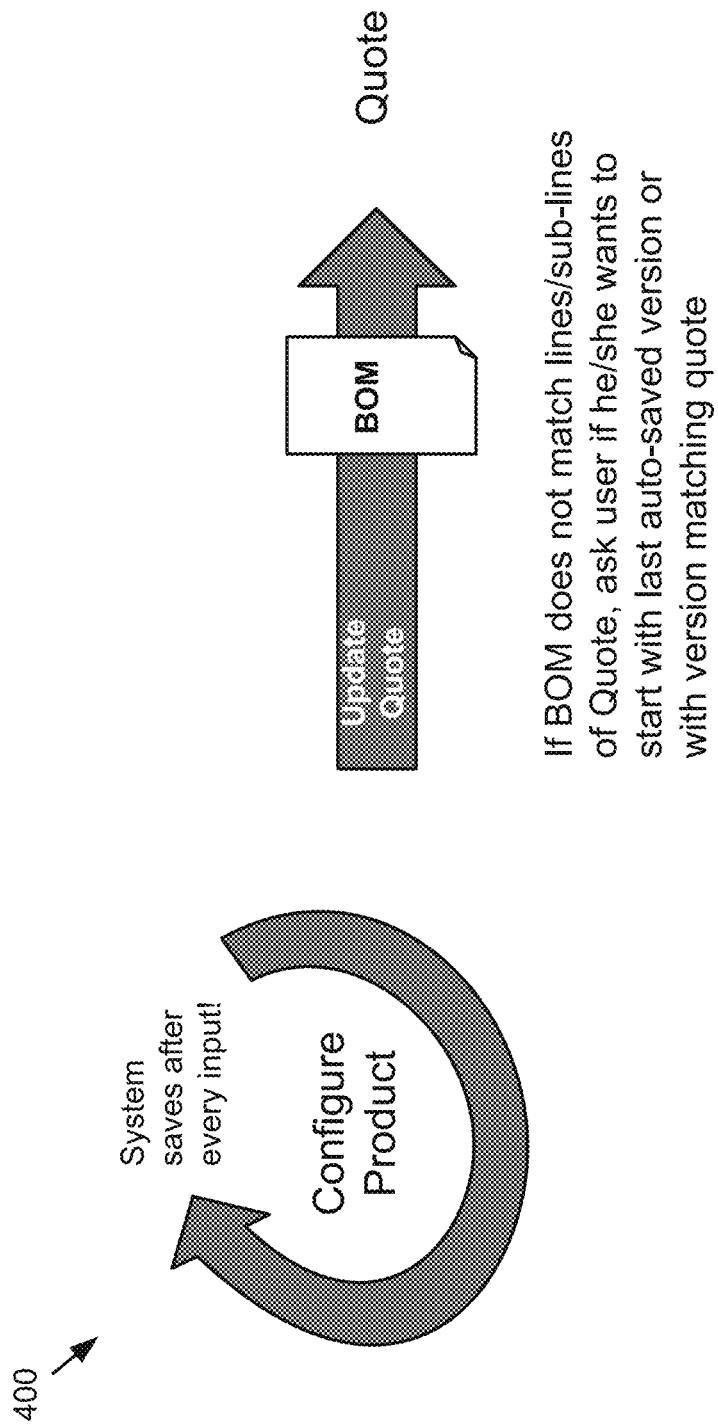
FIG. 4 is a block diagram illustrating an example process for auto-saving a product configuration.

FIG. 4 is a block diagram illustrating an example process for auto-saving a product configuration. As depicted, the configuration system 500 (e.g., see FIG. 5) may be configured to save a given product configuration after every input received from a user during a configuration session. A configuration state managed by the object model management engine 644 (see FIG. 6C) may include product information for the product being configured, such as a product description, the constituent components of the product (e.g., bill of material (BOM)), user selections and inputs (e.g., length of a trailer in feet), configuration error messages, pricing information, etc. In some embodiments, the configuration state including the BOM may be stored in a data store (e.g., the memory 604, the data store 610 as shown in FIG. 6A) of the modeling platform 518 (see FIG. 5) and the quote may be stored in a data store (e.g., the memory 604, the data store 610) of the configuration platform 524 (see FIG. 5).

During an auto-save, the BOM included in the configuration state may be used by the object model management engine 644 to update the quote associated with the product configuration. However, in some cases, the session may be abruptly terminated (e.g., due to a user application crash, system crash, a session time-out, or other termination event) and new session must be created so the user can continue to configure the product. To determine which version of the product configuration should be used to create the session, the system 500 can verify whether the bill of materials (BOM) matches quote. As the result of a configuration, the BOM may contain all the components of the configuration (e.g., according to how the product is configured). The BOM may also include any inputs (e.g., selections) the user provided during the configuration, even if some of these inputs did not drive specific BOM components. In cases where the BOM is in sync with the quote, the BOM component list may include the same information as the BOM stored in the quote, but may also include user inputs not reflected in the BOM of the quote.

The object model management engine 644 may retrieve the BOM from the data store of the modeling platform 518, may retrieve the quote from a data store of the configuration platform 524, and compare the components included in the BOM with the aspects of the quote to determine if they match. In some embodiments, the quote may be itemized into one or more quote line items, where each quote line item correspond to a main item of the product and may include one or more sub-line items corresponding to the components comprising that aspect of the product, and the components of the BOM and lines/sub-lines may be compared to determine whether the BOM and quote match.

If they do match, the object model management engine 644 may provide the version of the product configuration that matches the quote to the user. If they do not match, then the system 500 may notify the user of the conflict and prompt the user to select between the last auto-saved version or the version matching the quote, and may provide the selected version of the product configuration to the user.

Figure 5:
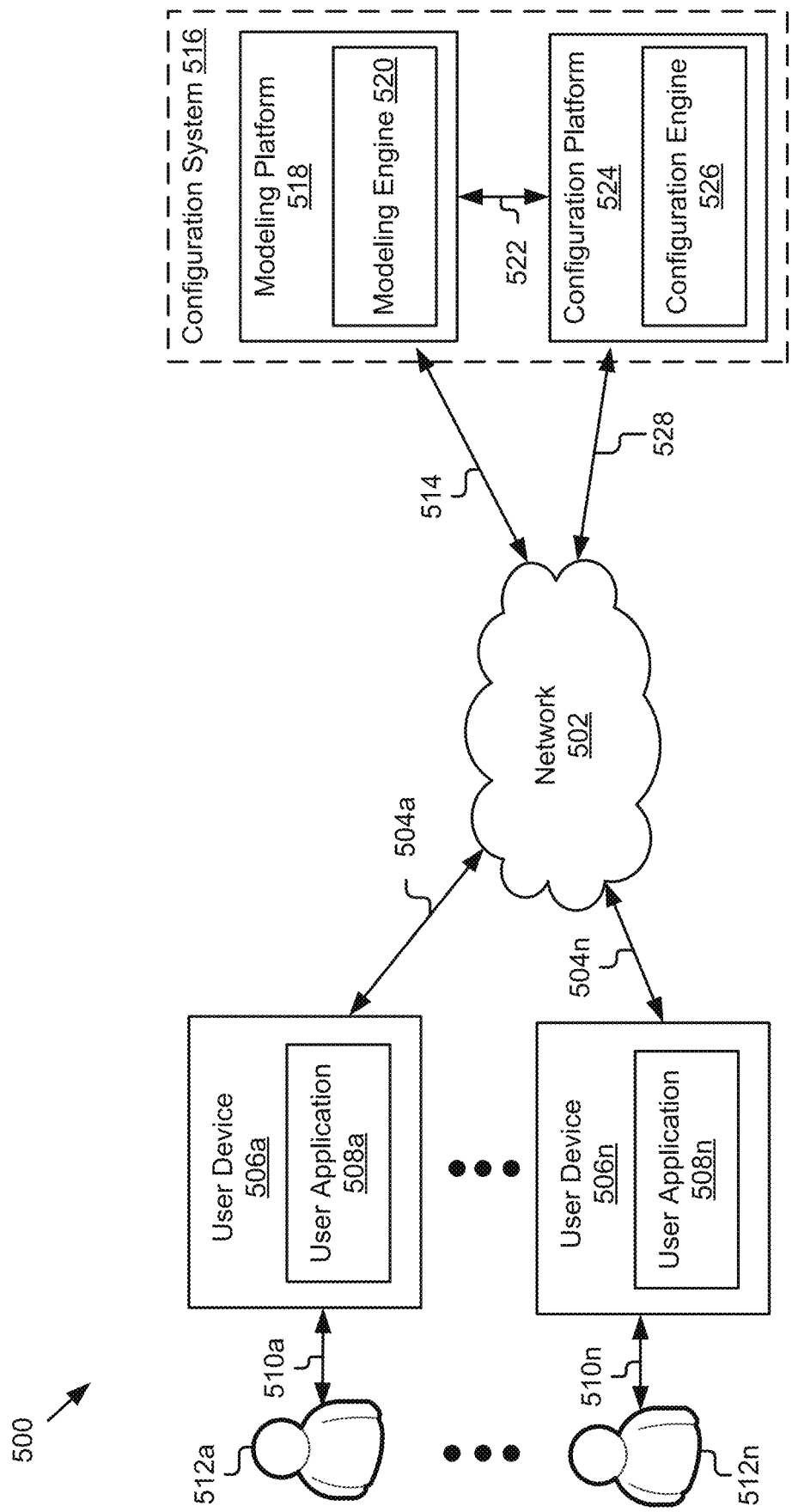
FIG. 5 is a block diagram illustrating an example product configuration system.
Figure 6A:
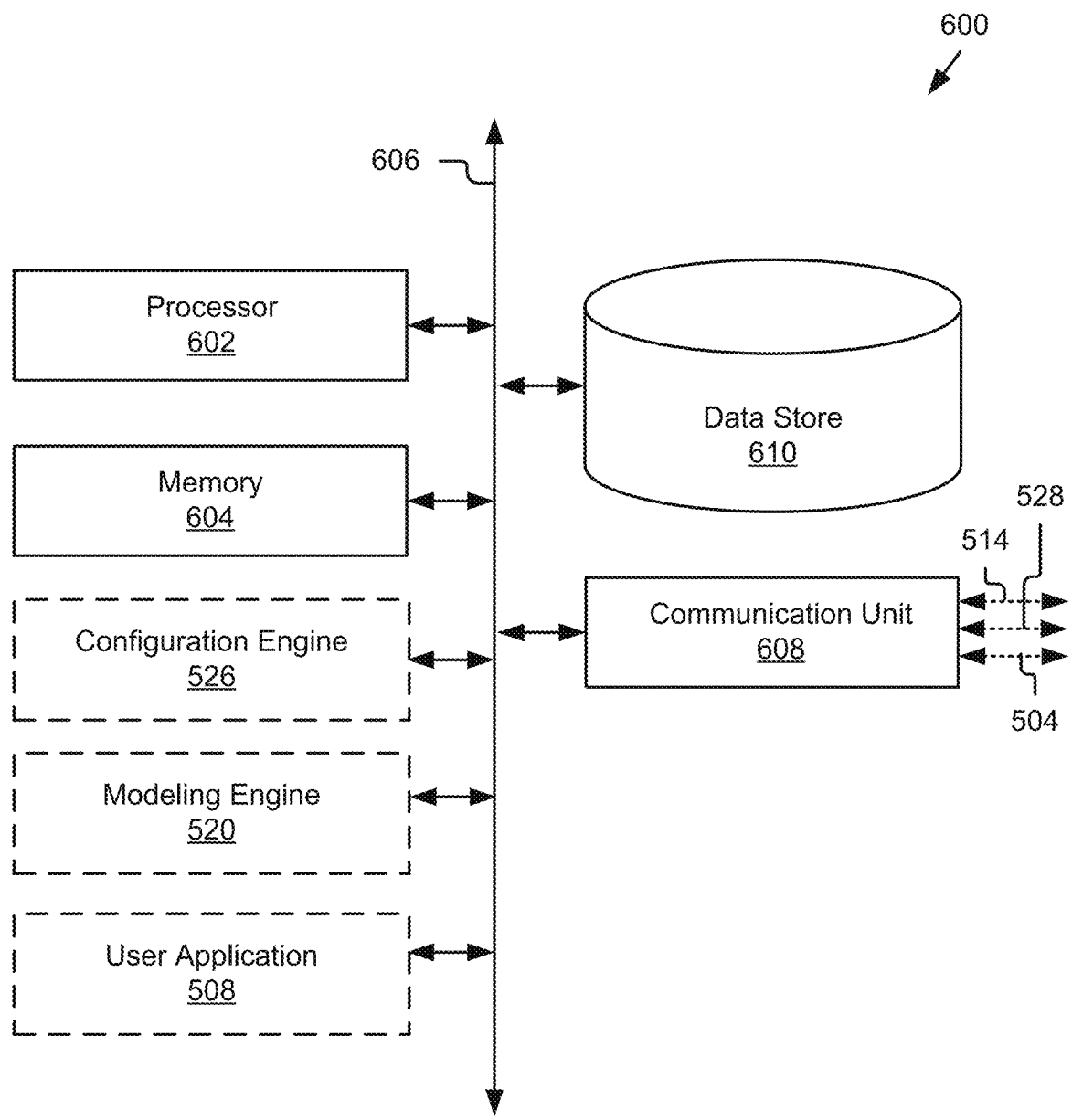
FIG. 6A is a block diagram of an example computing device.

FIG. 5 is a block diagram illustrating an example product configuration system 500. The illustrated system 500 includes user devices 506a . . . 506n and a configuration system 516, which are communicatively coupled via a network 502 for interaction with one another. For example, the user devices 506a . . . 506n may be respectively coupled to the network 502 via signal lines 504a . . . 504n and may be accessible by users 512a . . . 512n (also referred to individually and collectively as 512) as illustrated by lines 510a . . . 510n. As depicted in FIG. 5, the configuration system 516 includes a modeling platform 518 and a configuration platform 524. The modeling platform 518 may be respectively coupled to the network 502 via signal line 514, the configuration platform 524 may be coupled to the network 502 via signal line 528, and the modeling platform 518 and the configuration platform 524 may be coupled to each other via signal line 522. The use of the nomenclature "a" and "n" in the reference numbers indicates that the system 500 may include any number of those elements having that nomenclature.

It should be understood that the system 500 illustrated in FIG. 5 is representative of an example configuration system, and that a variety of different system environments and configurations are contemplated and are within the scope of the present disclosure. For instance, some implementations may include additional or fewer computing devices, services, and/or networks, and may implement various functionality user or configuration system-side. Further, various entities of the system 500 may be integrated into to a single computing device or system or additional computing devices or systems, etc.

The network 502 may include any number of networks. For example, the network 502 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, various combinations thereof, etc.

The user devices 506a . . . 506n (also referred to individually and collectively as 506) are computing devices having data processing and communication capabilities. In some implementations, a user device 506 may include a processor (e.g., virtual, physical, etc.), a memory, a power source, a communication unit, and/or other software and/or hardware components, including, for example, a display, graphics processor, wireless transceivers, keyboard, camera, sensors, firmware, operating systems, drivers, various physical connection interfaces (e.g., USB, HDMI, etc.). The user devices 506a . . . 506n may couple to and communicate with one another and the other entities of the system 500 via the network 502 using a wireless and/or wired connection.

Examples of user devices 506 may include, but are not limited to, mobile phones, tablets, laptops, desktops, netbooks, server appliances, servers, virtual machines, TVs, set-top boxes, media streaming devices, portable media players, navigation devices, personal digital assistants, etc. While two or more user devices 506 are depicted in FIG. 5, the system 500 may include any number of user devices 506. In addition, the user devices 506a . . . 506n may be the same or different types of computing devices.

In the depicted implementation, the user devices 506a . . . 506n respectively contain instances 508a . . . 508n of a user application (also referred to individually and collectively as 508). The user application 508 may be storable in a memory (not shown) and executable by a processor (not shown) of a user device 506. The user application 508 may include a browser application (e.g., a web-browser) that can retrieve and/or process information hosted by one or more entities of the system 500 (for example, the modeling platform 518 and/or the configuration platform 524) and can present the information on a display device (not shown) on the user device 506. In further examples, the user application 508 may be a dedicated application capable of performing the actions and providing the functionality discussed herein.

The configuration system 516 may include one or more computing devices having data processing, storing, and communication capabilities. For example, the configuration system 516 and/or its constituent components like the modeling platform 518 and/or the configuration platform 524 may include one or more hardware servers, virtual servers, server arrays, storage devices and/or systems, etc., which may be networked via the network 502 for cooperation and communication with one another. In some implementations, the configuration system 516, including the modeling platform 518 and/or the configuration platform 524, may be implemented using cloud-based architectures where one or more computer functions are performed by remote computing systems and devices at the request of a local computer device, although further implementations are also contemplated where the modeling platform 518 and/or the configuration platform 524 are implemented using local hardware and/or software resources or a combination of the foregoing. Additional structure, acts, and/or functionality of the modeling platform 518 and/or the configuration platform 524 are described in further detail elsewhere herein.

FIG. 6A is a block diagram of an example computing device 600, which may be representative of a computing device included in the configuration system 516, the modeling platform 518, the configuration platform 524, and/or the user device 506. As depicted, the computing device 600 may include a processor 602, a memory 604, a communication unit 608, a data store 610, and one or more of a configuration engine 526, a modeling engine 520, and the user application 508, which may be communicatively coupled by a communication bus 606.

Depending upon the configuration, the computing device 600 may include differing components. For instance, in a configuration system implementation, the computing device 600 may include the modeling engine 520 and/or the configuration engine 526. In a user device configuration, the computing device 600 may include the user application 508. In further implementations, a first computing device 600 representative of the modeling platform 518 may include the modeling engine 520, a second computing device 600 representative of the configuration platform 524 may include the configuration engine 526, and a plurality of third computing devices 600 representative of the user devices 506a . . . 506n may respectively include the user applications 508a . . . 508n. It should be understood that the above configurations are provided by way of example and numerous further configurations are contemplated and possible.

The processor 602 may execute software instructions by performing various input/output, logical, and/or mathematical operations. The processor 602 may have various computing architectures to process data signals including, for example, a complex instruction set computer (CISC) architecture, a reduced instruction set computer (RISC) architecture, and/or an architecture implementing a combination of instruction sets. The processor 602 may be physical and/or virtual, and may include a single core or plurality of processing units and/or cores. In some implementations, the processor 602 may be capable of generating and providing electronic display signals to a display device (not shown), supporting the display of images, capturing and transmitting images, performing complex tasks including various types of feature extraction and sampling, etc. In some implementations, the processor 602 may be coupled to the memory 604 via the bus 606 to access data and instructions therefrom and store data therein. The bus 606 may couple the processor 602 to the other components of the computing device 600 including, for example, the memory 604, communication unit 608, and the data store 610.

The memory 604 may store and provide access to data to the other components of the computing device 600. In some implementations, the memory 604 may store instructions and/or data that may be executed by the processor 602. The memory 604 is also capable of storing other instructions and data, including, for example, an operating system, hardware drivers, other software applications, databases, etc. The memory 604 may be coupled to the bus 606 for communication with the processor 602 and the other components of the computing device 600.

The memory 604 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 602. In some implementations, the memory 604 may include one or more of volatile memory and non-volatile memory. For example, the memory 604 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™ etc.). It should be understood that the memory 604 may be a single device or may include multiple types of devices and configurations.

The bus 606 can include a communication bus for transferring data between components of a computing device or between computing devices, a network bus system including the network 502 or portions thereof, a processor mesh, a combination thereof, etc. In some implementations, the configuration engine 526 and the modeling engine 520 may cooperate and communicate via a software communication mechanism implemented in association with the bus 606. The software communication mechanism can include and/or facilitate, for example, inter-process communication, local function or procedure calls, remote procedure calls, network-based communication, secure communication, etc.

The communication unit 608 may include one or more interface devices for wired and wireless connectivity with the network 502 and the other entities and/or components of the system 500 including, for example, the user devices 506, the modeling platform 518, the configuration platform 524, etc. For instance, the communication unit 608 may include, but is not limited to, CAT-type interfaces; wireless transceivers for sending and receiving signals using Wi-Fi™; Bluetooth®, cellular communications, etc.; USB interfaces; various combinations thereof; etc. The communication unit 608 may be coupled to the network 502 via the signal lines 514, 528, and 504. In some implementations, the communication unit 608 can link the processor 602 to the network 502, which may in turn be coupled to other processing systems. The communication unit 608 can provide other connections to the network 502 and to other entities of the system 500 using various standard communication protocols, including, for example, those discussed elsewhere herein.

The data store 610 is an information source for storing and providing access to data. In some implementations, the data store 610 may be coupled to the components 602, 604, 608, 520, 526, and/or 508 of the computing device 600 via the bus 606 to receive and provide access to data. In some implementations, the data store 610 may store data received from the other entities 506 and 516 of the system 500, and provide data access to these entities. The data store 610 can include one or more non-transitory computer-readable mediums for storing the data. In some implementations, the data store 610 may be incorporated with the memory 604 or may be distinct therefrom. In some implementations, the data store 610 may include a database management system (DBMS). For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

Figure 6B:
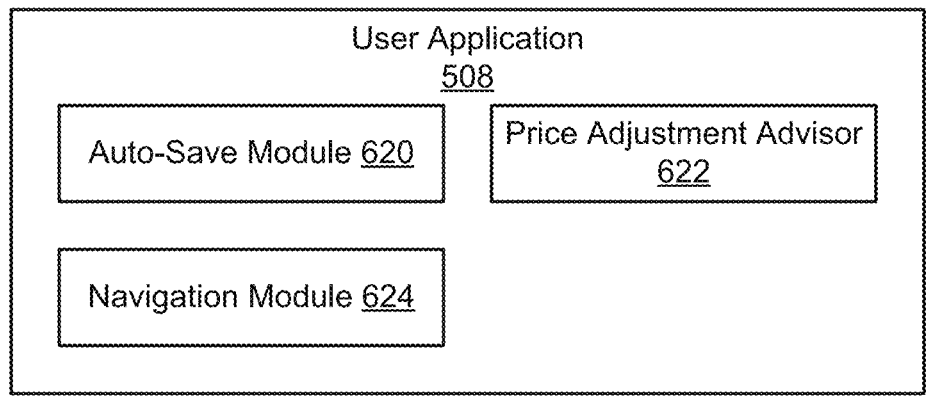
FIG. 6B is a block diagram of an example user application.
Figure 6C:
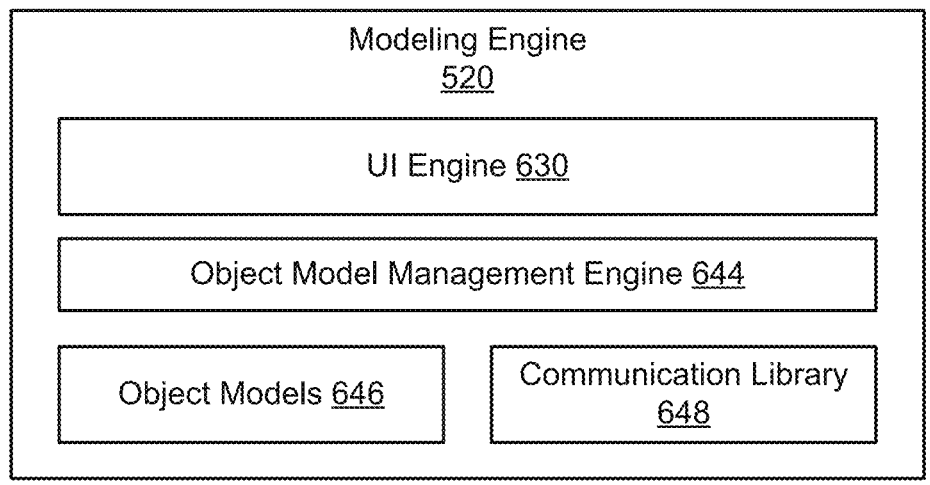
FIG. 6C is a block diagram of an example modeling engine.
Figure 7A:
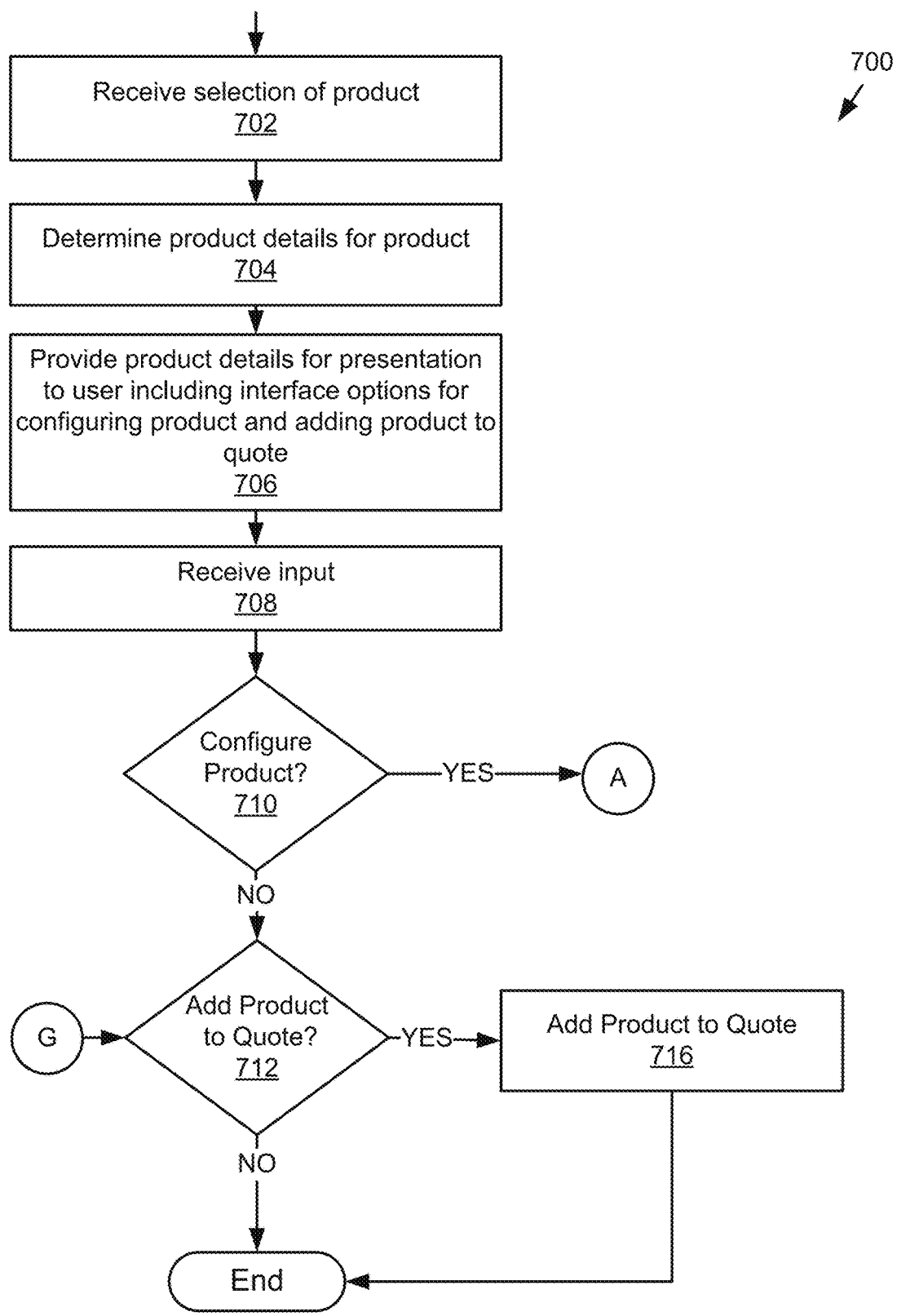
FIGS. 7A-7E are flowcharts of an example method for configuring a product and adding a product to a quote.
Figure 7B:
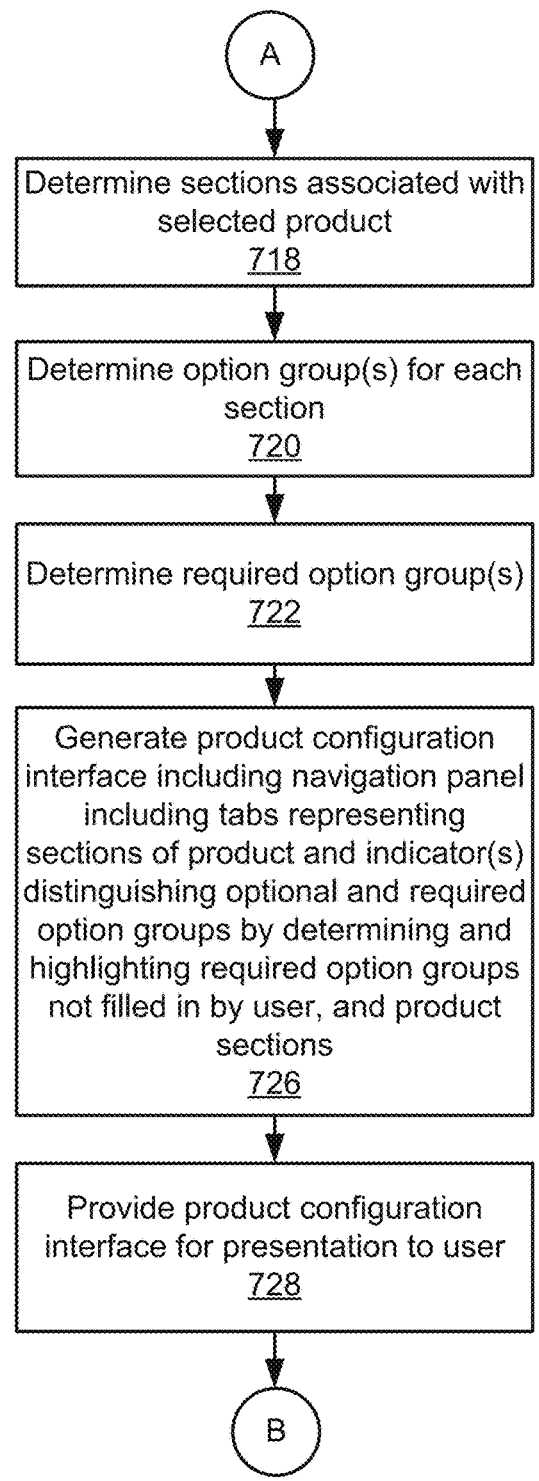
Figure 7C:
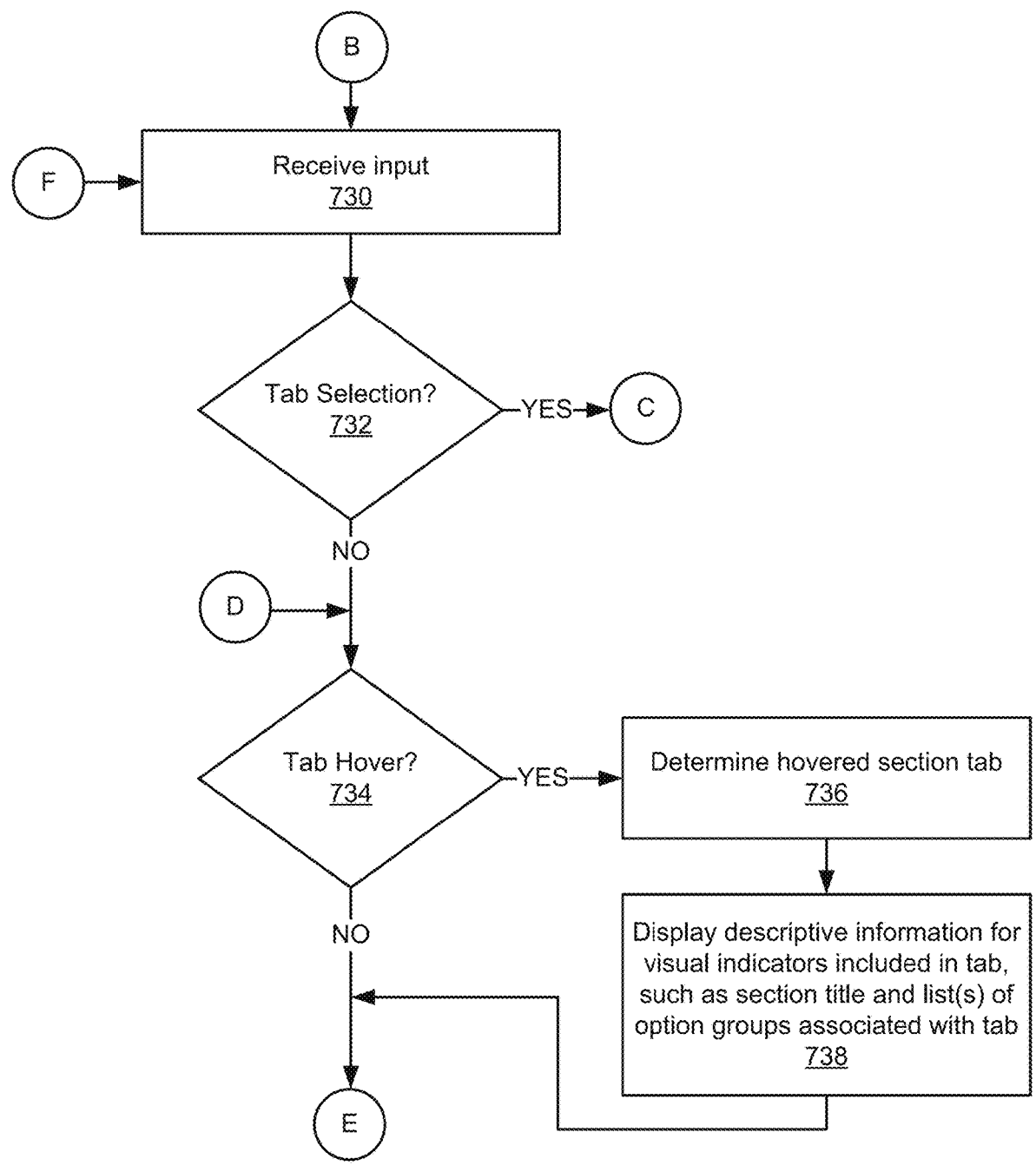
Figure 7D:
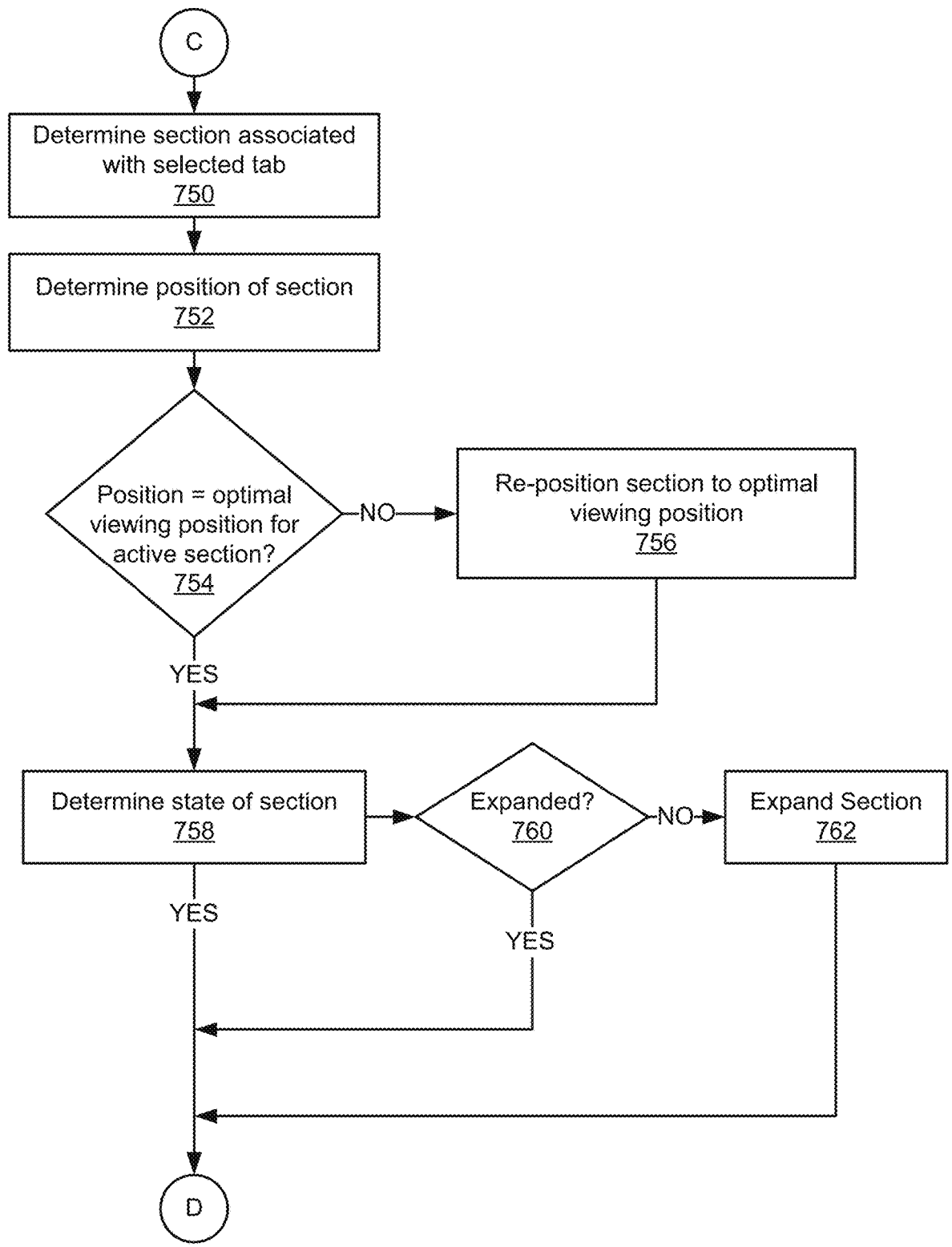
Figure 7E:
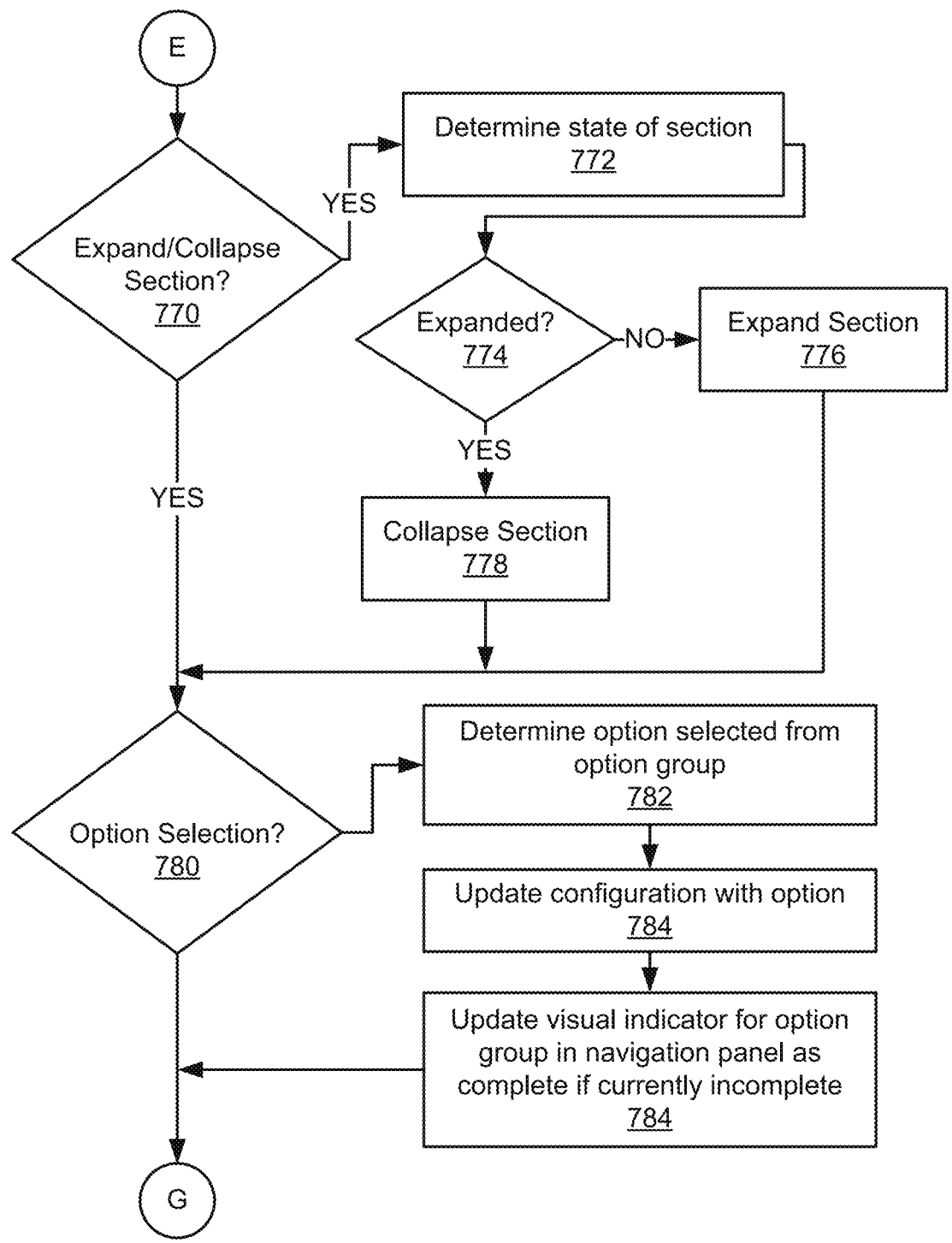

FIG. 6B is a block diagram of an example user application 508. As depicted, the user application 508 may include an auto-save module 620, a price adjustment advisor 622, and a navigation module 624, although the user application 508 is not limited to these components and may include other elements such as an interface module for rendering content for display and receiving and interpreting user input, a communication module for communicating with entities coupled to the network 502, etc. FIG. 6C is a block diagram of an example modeling engine 520. As depicted, the modeling engine 520 may include a UI engine 630, an object model management engine 644, object models 646, and a communication library 648.

The components 508, 520, 620, 622, 624, 630, 644, 646, and/or 648 may be communicatively coupled by the bus 606 and/or the processor 602 to one another and/or the other components 604, 608, 610, and/or 526 of the computing device 600. In some implementations, one or more of the components 508, 520, 620, 622, 624, 630, 644, 646, and/or 648 are sets of instructions executable by the processor 602 to provide their functionality. In other implementations, one or more of the components 508, 520, 620, 622, 624, 630, 644, 646, and/or 648 are stored in the memory 604 and are accessible and executable by the processor 602 to provide their functionality. In any of the foregoing implementations, these components 508, 520, 620, 622, 624, 630, 644, 646, and/or 648 may be adapted for cooperation and communication with the processor 602 and other components of the modeling platform 518 and/or the configuration platform 524.

The auto-save module 620, the price adjustment advisor 622, and the navigation module 624 each includes software and/or hardware logic for providing the features, acts, and/or functionality discussed herein with respect to these components, such as with reference to FIGS. 7A-9, for example. In some embodiments, the components 620, 622, and 624 may be implemented in objects executable by the user application 508. For instance, the components 620, 622, and 624 may be JavaScript objects that are provided by the UI engine 630 of the modeling engine 520 to the user application 508, and then interpreted by an interpreter (not shown) of the user application 508 to perform the acts and/or functionality discussed herein. However, it should be understood that other languages and configurations may be used without departing from the scope of this disclosure. In addition, while the auto-save module 620, price adjustment advisor 622, and navigation module 624 are depicted as disparate components, it should be under stood that these components may be combined into one or more components or further divided in to additional components, all of which are encompassed by the scope of this disclosure.

The UI engine 630 includes software and/or hardware logic for generating a user interface, rendering the interface for display to a user, receiving one or more inputs from the user on the user interface, and updating the interface based on the one or more inputs. For instance, the UI engine 630 can generate an interface including one or more interface components. By way of example, the UI engine 630 may generate and provide one or more of the interfaces discussed herein with respect to FIGS. 1-3J. In some implementations, the UI engine 630 may also be configured to receive data from the configuration engine 526 and render the data for display to a user. For instance, the UI engine 630 may receive data describing one or more operations performed by the configuration engine 526 and provide the data for display to a user on a user device. In some implementations, the data may be formatted using a markup language such as HTML, XML, JSON, etc., and provided by the UI engine 630 for rendering and display via the user application 508.

The object model management engine 644 includes software and/or hardware logic for managing one or more object models 646. For instance, an object model 646 may include data describing product model including, for example, one or more option groups, rules, products, attributes, options, etc., being configured and/or defined by a user. The object model management engine 644 may be responsible to keep these object models 646 up-to-date based on user configurations associated with the product models. By way of example, if a user adds and/or deletes one or more options, options groups, rules, attributes, etc. to/from a particular model, then the object model management engine 644 may incorporate these changes in the corresponding object model 646 and may be coupled to interact with the configuration engine 526 of the configuration platform 514 to evaluate the product model based on various rules associated with the model and/or update a quote associated with the product model.

The communication library 648 includes software and/or hardware logic for interacting with APIs (not shown) of the configuration engine 526. For instance, the modeling engine 520 and one or more its components (e.g., UI engine 630, Object Model Management Engine 644, etc.) may be coupled to and communicate with the communication library 648 to interact with the APIs of the configuration engine 526 for accessing various functionality, acts, and/or data provided by the configuration engine 526 and/or its respective components. For instance, the object model management engine 644 may communicate with the communication library 648 to interact with the APIs of the configuration engine 526 to save, configure, and/or generate a quote for a product in cooperation with the configuration engine 526 as described elsewhere herein. In some implementations, the communication library 648 may include APIs, which various components of the system 500 may use to access functionality, acts, and/or data provided by the modeling engine 520.

FIGS. 7A-7E depict an example method 700 for configuring a product and adding a product to a quote. In block 702, the user application 508 receives a selection of a product. Responsive to receiving the selection, the user application 508 determines 704 product details for the product and provides 706 the product details to the user for presentation. In some embodiments, the user application 508 determines the product details by retrieving the product details from the modeling engine 520, a local cache, or another information source. For instance, the data store 610 may include a product catalog and the UI engine 630 may generate and provide product details for the selected product using product data retrieved from the data store 610. In some embodiments, the product details may be provided in a product interface rendered for display by the user application 508 that includes options for configuring a product and adding a product to a quote, although other options may also be included, such as options enabling the user to search for, browse, select, and/or view details about various products from the product catalog. Examples product interfaces are depicted in at least FIGS. 1A and 1B, and further described herein with respect to those figures.

Next, the user application 508 receives 708 an input from the user and determines in block 710 whether the input is a request to configure the product. If so, the user application 508, in cooperation with the modeling engine 520, determines the information in blocks 718, 720, and 722. For instance, the user application 508 generates and sends a product configuration request to the modeling engine 520 including data describing the product the user wishes to configure. Responsive to receiving the product configuration request, the object model management engine 644 determines 718 (see FIG. 7B) the sections associated with the selected product, determines 720 the option group(s) for each section, and determines 722 which option groups are required. In some embodiments, the object model management engine 644 may determine the information in blocks 718, 720, and 722 by querying the data store 610 using a product identifier from the product configuration request. Then, the UI engine 630 receives the data determined in blocks 718, 720, and 722 by the object model management engine 644 and provides it to the user application 508 (e.g., in a web-based format (e.g., HTML, CSS, JavaScript, XML, JSON, etc.)).

Next, in block 726, the user application 508 may generate a product configuration interface including a navigation panel and the plurality of product sections associated with the product based on the information determined in blocks 718, 720, and 722. The navigation panel may including a plurality of tabs, where each of the tabs represents a certain section from the sections comprising the product and included in the product configuration page. Each tab may include one or more indicators corresponding to the one or more option groups included in the section to which it corresponds. Each indicator included in the navigation panel may visually indicate whether a corresponding required option group has been completed (e.g., an option from the option group has been selected). A non-limiting example product configuration interface is discussed herein with respect to at least FIGS. 2A-2E, and further described herein with respect to those figures.

In block 728, the user application 508 may provide the product configuration interface to the user for presentation and, in response, may receive 730 (see FIG. 7C) a user input. If in block 732, the navigation module 624 of the user application 508 determines the input to be a tab selection selecting a tab from among the plurality of tabs included in the product configuration interface based on the user input, the navigation module 624, if necessary, proceeds to reposition the section associated with the tab selection and expand the section so its contents are visible. For instance, the navigation module determines 750 (see FIG. 7D) which section from the plurality of sections is associated with the tab selected by the tab selection; determines 752 a position of the section and determines 754 whether the position of the section associated with the tab selection equals an optimal viewing position for an active section, and if not, repositions 756 the section associated with the tab selection to the optimal viewing position. If yes, the navigation module 624 in block 758 determines the expansion state of the section, and based on the expansion state, determines in block 760 if the section is in a collapsed or expanded state. If the section is not expanded (i.e., has a collapsed state), the navigation module 624 proceeds to automatically expand 762 the selected section so the details for the section, such as the option groups associated with the section may be visible to the user. A non-limiting example of a repositioned section is depicted in at least FIG. 2B, and further described herein with respect to that figure.

With reference to block 734 (see FIG. 7C), method 700 continues with the navigation module 624 determining whether the user input received in block 730 is a tab hover action, and if so, proceeds to determine 736 which tab from the among the plurality of tabs is being hovered, and based on this determination, displays 738 descriptive information for the one or more indicators included in the tab being hovered (e.g., by modifying a visibility property (e.g., a CSS property) via a DOM). A non-limiting example of descriptive information is depicted in FIG. 2C, and further described herein with respect to that figure.

With reference to block 770 (see FIG. 7E), method 700 continues with the navigation module 624 determining whether the user input received in block 730 is an expand/collapse section action, and if so, the navigation module 624 determines 772 a state of the section describing whether the section is expanded or collapsed, determines in block 774 if the section is expanded based on the state, if not, expands the section in block 776. Otherwise, the navigation module 624 collapses the section in block 778.

With reference to block 780, method 700 continues with the navigation module 624 determining whether the user input received in block 730 is an option selection, and if so, determines 782 an option selected from the option group, updates 784 the configuration with the option, and updates 784 a visual indicator included in the navigation panel for the option group to indicate that an option from the option group has been selected if no option from the option group was previously selected. For example, to update the visual indicator, the navigation module 624 may change the color of the indicator, a shape of the indicator, a graphic of the indicator, or make another suitable change that is visually perceptible to the user.

If in block 712 (see FIG. 7A), the user application 508 determines the user input (e.g., received in block 708 or 730) to be a request to add the product to a quote, the user application 508 generates and sends a request to the object model management engine 644 requesting the product be added to a quote, which stores data describing the product in the data store in association with an entry describing the quote as indicated by block 716. The method 700 then ends.

Figure 8A:
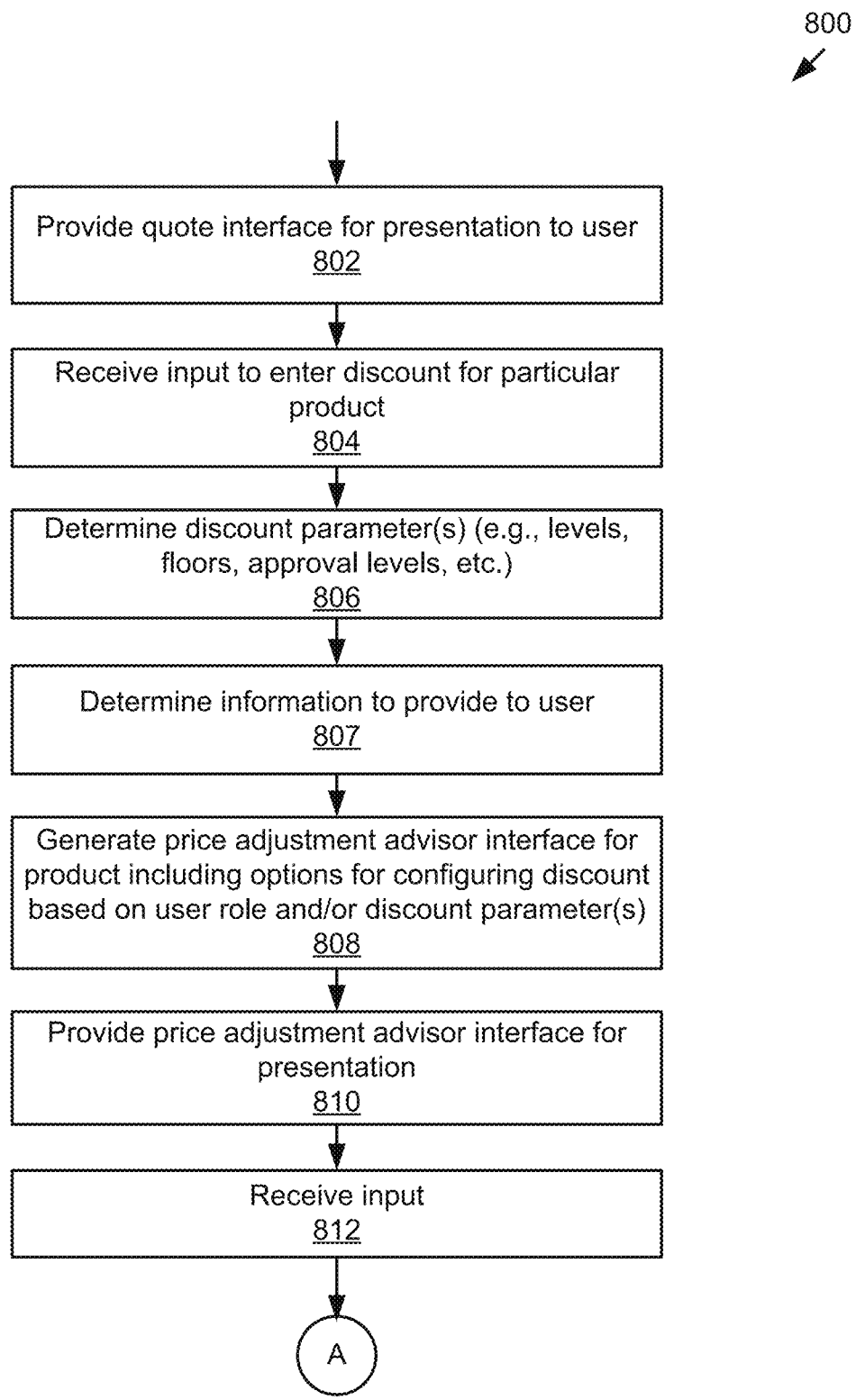
FIGS. 8A and 8B are flowcharts of an example method for configuring a price adjustment for a product.
Figure 8B:
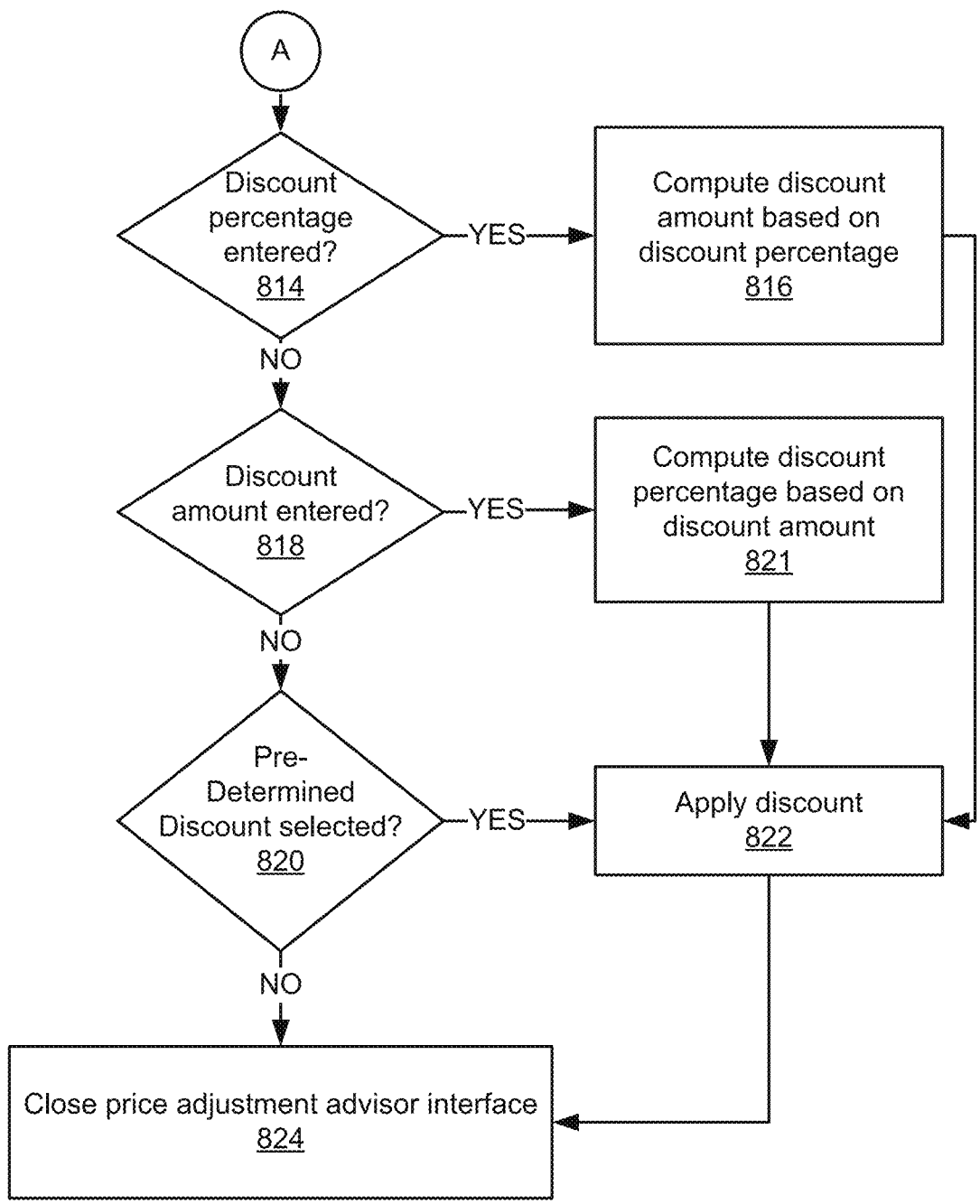

FIGS. 8A and 8B are flowcharts of an example method 800 for configuring a price adjustment for a product. In block 802, the user application 508 may provide a quote interface for presentation to a user. For example, the user application 508 may receive a product quoting webpage from the UI engine 630 of the modeling engine 520 and display it to the user. A non-limiting example of a quote interface is depicted in FIG. 3A, and further described herein with respect to that figure.

In block 804, the user application 508 may receive 804 an input to enter a price adjustment (e.g., discount) for a particular product and the price adjustment advisor 622 may capture the input and determine 806 one or more price (e.g., discount) adjustment parameters for governing the configuration of the price adjustment (e.g., discount). For instance, the price adjustment advisor 622 may determine a discount threshold (also called an approval level) for determining at what amount a discount would require approval from a supervisor. Other examples of discount parameters include discount levels, discount types, etc. In block 802, the method 800 may determine what information to provide to the user. In some embodiments, the price adjustment advisor 622 or the modeling engine 520 may determine what information should be provided based on the various role(s) (e.g., sales manager, sales rep, etc.) the user has been assigned via the configuration system 516. For instance, some discount information, such as margin levels, discount floors, and prior discount levels, etc., may be restricted for certain types of users only and the price adjustment advisor 622, the modeling engine 520, or another component, may determine what information should be displayed by verifying that the user has the necessary role/authorization for viewing that information. For instance, a discount parameter (e.g., margin levels) may be shown in a price adjustment advisor interface for one user type (e.g., a pricing user) but not for another user type (e.g., a sales representative). Next, the price adjustment advisor 622 generates 808, based on the price adjustment parameters and/or the user role/type, a price adjustment advisor interface including options for configuring the price adjustment and provides 810 the price adjustment advisor interface for presentation. In some embodiments, the price adjustment advisor interface may include a price adjustment calculator having a percentage field for entering a price adjustment percentage, a monetary field for entering a price adjustment amount, and/or other elements, as discussed elsewhere herein, such as with reference to at least FIGS. 3B-3F.

In block 812, the price adjustment advisor 622 may receive an input via the price adjustment advisor interface. In block 814 (see FIG. 8B), the price adjustment advisor 622 determines whether the input describes that a price adjustment percentage was entered, and if so, computes 816 the price adjustment amount based on the price adjustment percentage and then proceeds to block 822 where it applies the price adjustment using the price adjustment amount. Alternatively, in block 818, the price adjustment advisor 622 determines whether the input describes that a price adjustment amount was entered, and if so, computes the price adjustment percentage based on the price adjustment amount and then proceeds to block 822 where it applies the price adjustment using the price adjustment amount and the percentage. If the input neither describes a price adjustment percentage nor a price adjustment amount, the price adjustment advisor 622 determines whether the input describes that a pre-determined price adjustment (e.g., discount) was selected, and if so, applies the pre-determined price adjustment in block 822. The price adjustment advisor 622 then proceeds to block 824 to close the price adjustment advisor interface. Additional features, operations, structure, actions, and functionality associated with the price adjustment advisor are discussed elsewhere herein, for example, with respect to at least FIGS. 3A-3J.

Figure 9:
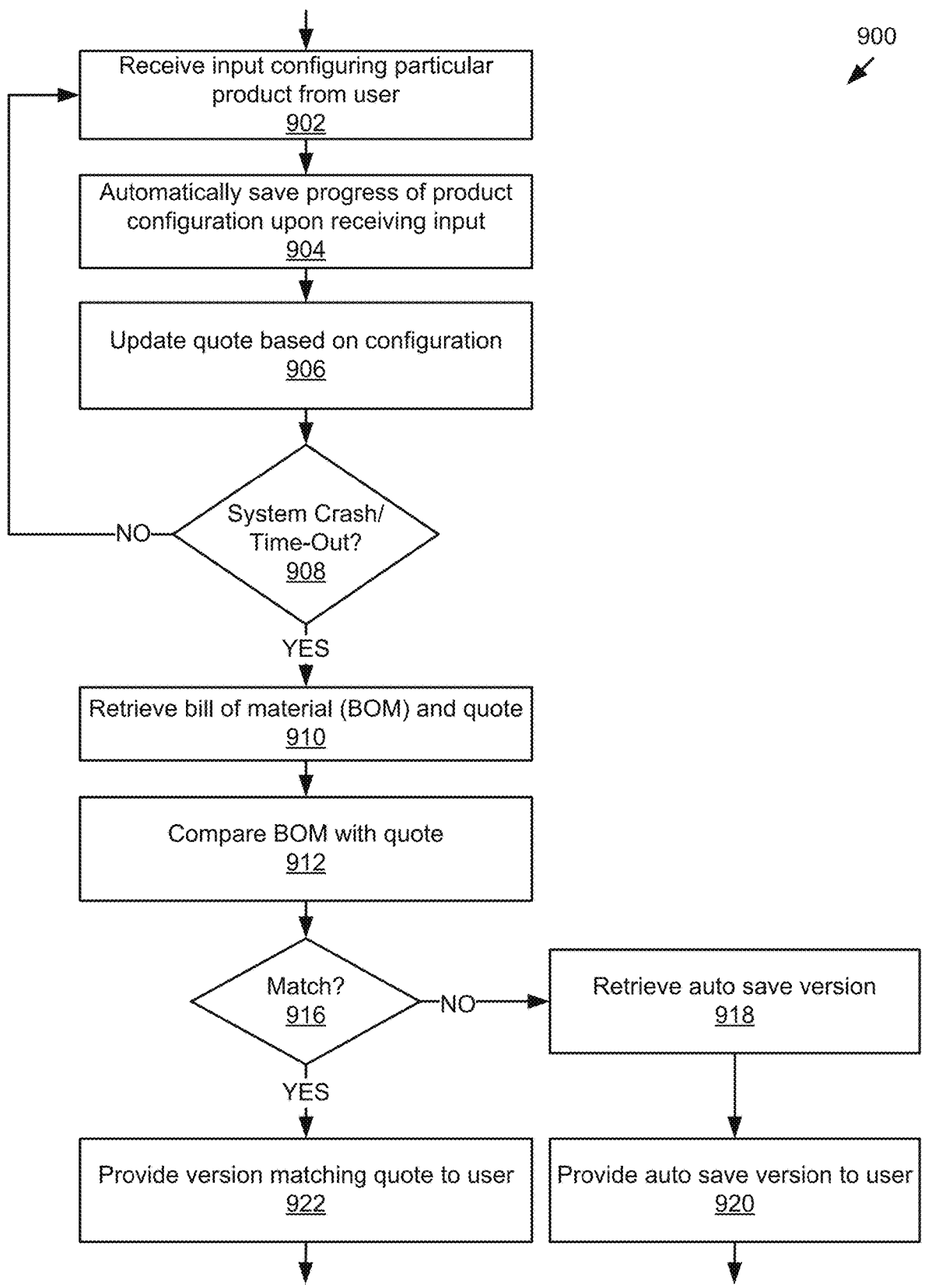
FIG. 9 is a flowchart of an example method for auto-saving and restoring a product configuration.

FIG. 9 depicts an example method 900 for auto-saving and restoring a product configuration. In block 902, the auto-save module 620 receives a user input to configure a product, and in response, automatically saves 904 the progress of the configuration of the product responsive to receiving the user input. For example, the auto save module 620 transmits a save request to the object model management engine 644 of the modeling engine 520, which saves the progress of the product configuration.

In conjunction with the auto-save operation in block 904, the object model management engine 644 updates 906 a quote for the product being configured based on the saved configuration. If in block 908, no system crash, time-out, or other session-terminating event has occurred, the method 900 iterates through blocks 902-906 as needed to configure the product. However, if at some point during the configuration, the user application 508 determines 908 that a system crash, time-out, or other session-terminating event has occurred (e.g., responsive to a user subsequently attempting to access the session after the event), the user application 508 proceeds to reinitialize the configuration session and restore the configuration state of the product with the most suitable version.

For instance, upon receiving a product configuration request from the user application 508, the object model management engine 644 may retrieve 910 the bill of material (BOM) and the quote associated with the product from storage (e.g., using a product identifier included in the request) and may then compare 912 the BOM with the quote to determine whether they match. If the BOM matches the quote in block 916, the object model management engine 644 may provide the version of the product configuration matching the quote to the user (e.g., by generating and sending corresponding product configuration data to the user application 508 for display). If the BOM does not match the quote in block 916, the object model management engine 644 may retrieve and provide the automatically saved version of the product configuration to the user as indicated in blocks 918 and 920, respectively (e.g., by generating and sending corresponding product configuration data to the user application 508 for display).

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method, comprising:
receiving, by one or more computing devices, a selection of a product;
determining, by the one or more computing devices, a plurality of sections associated with the product;
determining, by one or more computing devices, a plurality of option groups for each of the sections, each option group in the plurality of option groups including a plurality of options for the product;
generating, by one or more computing devices, a product configuration page including a navigation panel and the plurality of sections associated with the product, the navigation panel including a plurality of tabs, each tab in the plurality of tabs representing a respective section of the plurality of sections, each of the plurality of tabs including a plurality of indicators corresponding to the plurality of option groups included in the respective section, the plurality of indicators indicating a plurality of completion statuses for the plurality of option groups, the plurality of completion statuses including: a product configuration option not-yet filled out, a product configuration option not required, and a product configuration option completed, wherein each indicator of the plurality of indicators continues to visually indicate a completion status from the plurality of completion statuses within a respective one of the plurality of tabs in the navigation panel while another of the plurality of tabs is selected;
providing, by one or more computing devices, the product configuration page for presentation to a user;
receiving, by one or more computing devices, a first user input;
determining, by one or more computing devices, the first user input to be a tab selection selecting a tab from among the plurality of tabs based on the first user input;
determining, by the one or more computing devices, which section from the plurality of sections is associated with the tab selected by the tab selection;
determining, by one or more computing devices, a position of the section associated with the tab selection relative to an optimal viewing position for an active section;
repositioning, by one or more computing devices, a section associated with the tab selection to the optimal viewing position; and
for each option group in the plurality of option groups:
determining no option from the plurality of options from the option group was previously selected;
receiving, by one or more computing devices, a second user input;
determining, by one or more computing devices, the second user input to be an option selection of an option from the plurality of options included in the option group; and
updating, by one or more computing devices, the completion status of an indicator of the plurality of indicators corresponding to the option group to indicate that the option has been selected based on the second user input.

2. The computer-implemented method of claim 1, further comprising:

receiving, by one or more computing devices, a second user input;
determining, by one or more computing devices, the second user input to be a hover action in which a tab is being hovered;
determining, by one or more computing devices, which tab from among the plurality of tabs is being hovered; and
displaying, by one or more computing devices, descriptive information for the plurality of option groups corresponding to the plurality of indicators included in the tab being hovered.

3. The computer-implemented method of claim 2, wherein the descriptive information includes a section title of the section associated with the tab and the plurality of option groups associated with the plurality of indicators.

4. A system comprising:
one or more processors;
one or more memories storing instructions that, when executed by the one or more processors, cause the system to perform operations comprising:
receiving a selection of a product;
determining a plurality of sections associated with the product;
determining a plurality of option groups for each of the sections, each option group in the plurality of option groups of each of the sections including a plurality of options for the product;
generating a product configuration page including a navigation panel and the plurality of sections associated with the product, the navigation panel including a plurality of tabs, each tab in the plurality of tabs of the navigation panel representing a respective section of the plurality of sections, each of the plurality of tabs including a plurality of indicators corresponding to the plurality of option groups included in the respective section, the plurality of indicators indicating a plurality of completion statuses for the plurality of option groups, the plurality of completion statuses including: a product configuration option not-yet filled out, a product configuration option not required, and a product configuration option completed, wherein each indicator of the plurality of indicators continues to visually indicate a completion status from the plurality of completion statuses within a respective one of the plurality of tabs in the navigation panel while another of the plurality of tabs is selected;
providing the product configuration page for presentation to a user;
receiving, by one or more processors, a first user input;
determining, by one or more processors, the first user input to be a tab selection selecting a tab from among the plurality of tabs based on the first user input;
determining, by the one or more processors, which section from the plurality of sections is associated with the tab selected by the tab selection;
determining, by one or more processors, a position of the section associated with the tab selection relative to an optimal viewing position for an active section;
repositioning, by one or more processors, the section associated with the tab selection to the optimal viewing position; and
for each option group in the plurality of option groups:
determining no option from the plurality of options from the option group was previously selected;
receiving, by one or more processors, a second user input;

determining, by one or more processors, the second user input to be an option selection of an option from the plurality of options included in the option group; and updating, by one or more processors, the completion status of an indicator of the plurality of indicators corresponding to the option group to indicate that the option has been selected based on the second user input.

5. The system of claim 4, wherein the instructions, when executed by the one or more processors, further cause the system to perform operations comprising:

receiving a second user input selecting a particular option from a particular option group of a particular section from the plurality of sections of the product configuration page; and updating, in the navigation panel, a particular indicator from the plurality of indicators of a particular tab from the plurality of tabs, the updated indicator corresponding to the option group of the particular section from the plurality of sections of the product configuration page, the updated indicator of the particular tab visually portraying a change in a completion status of the particular option group of the particular section from the plurality of sections of the product configuration page.

6. The system of claim 4, wherein the instructions, when executed by the one or more processors, further cause the system to perform operations comprising:

receiving a second user input;

determining the second user input to be a hover action in which a tab is being hovered;

determining which tab from among the plurality of tabs is being hovered; and displaying descriptive information for the plurality of option groups corresponding to the plurality of indicators included in the tab being hovered.

7. The system of claim 6, wherein the descriptive information includes a section title of the section associated with the tab and the plurality of option groups associated with the plurality of indicators.

8. A system for generating an interface for configuring a product, the system comprising:

one or more processors;

one or more memories storing instructions that, when executed by the one or more processors, cause the system to perform operations comprising:

generating an interface including:

a plurality of sections associated with a product, each section of the plurality of sections including a plurality of option groups, each option group in the plurality of option groups including a plurality of options selectable to configure the product; and a navigation panel including a plurality of tabs, each tab in the plurality of tabs of the navigation panel representing a respective section of the plurality of sections, each of the plurality of tabs including a plurality of indicators corresponding to the plurality of option groups included in the respective section, the plurality of indicators indicating a plurality of completion statuses for the plurality of option groups, the plurality of completion statuses including: a product configuration option not-yet filled out, a product configuration option not required, and a product configuration option completed, wherein each indicator of the plurality of indicators continues to visually indicate a completion status from the plurality of completion statuses within a respective one of the plurality of tabs in the navigation panel while another of the plurality of tabs is selected;

providing the interface for presentation to a user;

receiving, by one or more processors, a first user input;

determining, by one or more processors, the first user input to be a tab selection selecting a tab from among the plurality of tabs based on the first user input;

determining, by the one or more processors, which section from the plurality of sections is associated with the tab selected by the tab selection;

determining, by one or more processors, a position of the section associated with the tab selection relative to an optimal viewing position for an active section;

repositioning, by one or more processors, the section associated with the tab selection to the optimal viewing position; and for each option group in the plurality of option groups:

determining no option from the plurality of options from the option group was previously selected;

receiving, by one or more processors, a second user input;

determining, by one or more processors, the second user input to be an option selection of an option from the plurality of options included in the option group; and updating, by one or more processors, the completion status of an indicator of the plurality of indicators corresponding to the option group to indicate that the option has been selected based on the second user input.

9. The system of claim 8, wherein at least one indicator of the plurality of indicators indicates that a corresponding option group has none of the options included in the corresponding option group selected, and the at least one indicator is updated to indicate that at least one option from the corresponding option group has been selected upon user selection of the at least one option.

10. The computer-implemented method of claim 1, further comprising:

expanding a first section of the plurality of sections to show the plurality of option groups comprising the first section.

11. The computer-implemented method of claim 1, further comprising:

detecting a hover action over a first tab from the plurality of tabs; and responsive to detecting the hover action, displaying descriptive information about the plurality of indicators included in the first tab.

12. The computer-implemented method of claim 11, wherein the descriptive information including errors present in a current configuration associated with the product.

13. The computer-implemented method of claim 1, wherein the plurality of indicators of a first tab of the plurality of tabs includes two or more indicators that visually indicate two or more different statuses.

14. The computer-implemented method of claim 13, wherein at least one of the different statuses reflects one of:

a conflict between options within a given option group;

an unavailability of an option in an option group;

a properly configured option group;

a user-selected value; and a system-selected value.

* * * * *